(12) United States Patent
Omidi

(10) Patent No.: US 12,539,458 B2
(45) Date of Patent: Feb. 3, 2026

(54) MULTI-LAYER TOY

(71) Applicant: Rayan Omidi, Katy, TX (US)

(72) Inventor: Rayan Omidi, Katy, TX (US)

( * ) Notice: Subject to any disclaimer, the term of this patent is extended or adjusted under 35 U.S.C. 154(b) by 789 days.

(21) Appl. No.: 17/875,749

(22) Filed: Jul. 28, 2022

(65) Prior Publication Data

US 2022/0362658 A1 Nov. 17, 2022

Related U.S. Application Data

(63) Continuation-in-part of application No. PCT/US2020/067110, filed on Dec. 28, 2020.

(51) Int. Cl.
| | | |
|---|---|---|
| G09B 1/18 | (2006.01) | |
| A63F 3/00 | (2006.01) | |
| G09B 19/02 | (2006.01) | |

(52) U.S. Cl.
CPC ...... *A63F 3/00214* (2013.01); *A63F 3/00261* (2013.01); *G09B 1/18* (2013.01); *G09B 19/02* (2013.01); *A63F 2003/00268* (2013.01)

(58) Field of Classification Search
CPC .... G09B 19/02; G09B 1/18; G09B 27/00–08; G09B 1/00; G09B 1/30
See application file for complete search history.

(56) References Cited

U.S. PATENT DOCUMENTS

| | | |
|---|---|---|
| 247,402 A | 9/1881 | Peck |
| 408,148 A | 7/1889 | Throop |
| 2,504,650 A | 4/1950 | Chessrown |
| 2,728,167 A | 12/1955 | Knott |
| 2,732,655 A | 1/1956 | Dirckx |
| 2,755,577 A | 7/1956 | Greensfelder |
| 3,063,163 A | 11/1962 | Dukes, Jr. |
| 3,081,089 A | 3/1963 | Gustafson |
| 3,122,859 A | 3/1964 | La Reaux, Jr. |
| 3,596,380 A | 8/1971 | Williams |
| 3,661,391 A | 5/1972 | Henshaw |
| 3,683,526 A | 8/1972 | Horvath |
| 3,717,942 A | 2/1973 | Presby |
| 3,863,364 A | 2/1975 | King |

(Continued)

FOREIGN PATENT DOCUMENTS

| | | | |
|---|---|---|---|
| AU | 2008205452 B1 | * 11/2008 | ............. G09B 25/06 |
| BR | 8202416 A | 4/1983 | |

(Continued)

OTHER PUBLICATIONS

English Translation of KR100461693B1 (also listed as 10-2004-0024072 in Translation) (Year: 2004).*

(Continued)

*Primary Examiner* — Kyle R Grabowski
(74) *Attorney, Agent, or Firm* — Brett A. Schenck

(57) ABSTRACT

A multi-layer toy having at least one outer layer adjacent a planar layer or a ball where both the outer layer and the adjacent planar layer or ball each contain related information such that, in play, the information on the outer layer is made to align with the related information on the adjacent planar layer or ball. The information can comprise depictions of objects, things, characters, animals, or words, for a matching game, or the information can comprise numbers for a counting or mental math game. The toy is preferably sized to be hand-held.

19 Claims, 38 Drawing Sheets

(56) References Cited

U.S. PATENT DOCUMENTS

| | | |
|---|---|---|
| 3,995,862 A | 12/1976 | Bertin |
| 3,997,980 A | 12/1976 | Rogers |
| 4,341,035 A | 7/1982 | Jaworski et al. |
| 4,508,344 A | 4/1985 | Krogh |
| 4,585,231 A | 4/1986 | Batmanghlich |
| 4,634,385 A | 1/1987 | Stemper |
| 4,920,033 A | 4/1990 | Cress |
| 4,973,253 A | 11/1990 | Shook et al. |
| 5,110,206 A | 5/1992 | Mischke |
| 5,505,621 A * | 4/1996 | Lamphiear ............. G09B 27/08 434/137 |
| 5,727,949 A | 3/1998 | Bar-Or et al. |
| 6,068,486 A * | 5/2000 | Frank .................... G09B 27/08 434/130 |
| 6,221,457 B1 | 4/2001 | Rasmussen |
| 6,272,776 B1 | 8/2001 | Santorsola |
| 6,290,230 B1 | 9/2001 | Anthony |
| 6,592,122 B2 | 7/2003 | Ikenaga |
| 7,314,179 B1 | 1/2008 | Halbur et al. |
| 7,861,926 B2 | 1/2011 | Sheldon et al. |
| 8,459,999 B2 | 6/2013 | Washington |
| 10,037,007 B2 | 7/2018 | Fender |
| 10,262,558 B2 | 4/2019 | Lin |
| 10,276,063 B1 | 4/2019 | Usi |
| 10,878,720 B1 | 12/2020 | Omidi |
| 10,950,141 B1 | 3/2021 | Omidi |
| 2002/0105139 A1 * | 8/2002 | Ficinski ............. A63F 9/0873 273/157 R |
| 2003/0003427 A1 | 1/2003 | Wood et al. |
| 2020/0306622 A1 | 10/2020 | Pfeffer et al. |

FOREIGN PATENT DOCUMENTS

| | | | |
|---|---|---|---|
| CN | 2035521 U * | 4/1989 | |
| CN | 104680923 A * | 6/2015 | ............. G09B 27/08 |
| EP | 0063816 A2 | 11/1982 | |
| GB | 2157050 A * | 10/1985 | ............. G09B 27/08 |
| GB | 2206053 A | 12/1988 | |
| JP | S57180983 A | 11/1982 | |
| JP | 2016189814 A | 11/2016 | |
| KR | 100461693 B1 * | 12/2004 | |
| WO | WO2015051753 A1 | 4/2015 | |
| WO | WO-2022019727 A1 * | 1/2022 | ............. G09B 27/06 |

OTHER PUBLICATIONS

The International Search Report and the Written Opinion of the International Searching Authority, or the Declaration for International Application No. PCT/US2020/067110, Jul. 4, 2023.

"Notice of refusal (with English translation)" for Japanese application No. JJP2023-539305, Sep. 18, 2024.

"Extended European Search Report" for European Application No. EP20200968149 Dec. 28, 2020, Sep. 17, 2024.

* cited by examiner

MULTI-LAYER TOY

FIELD OF THE INVENTION

This application is a continuation-in-part of PCT International Application No. PCT/US20/67110, filed Dec. 28, 2020, which is hereby incorporated by reference in its entirety.

The present invention is in the field of children's toys, and in particular relates to a three-dimensional, "hands on" activity toy that is intended to engage a child and encourage him or her to think.

BACKGROUND OF THE INVENTION

Children enjoy playing with bright and multi-colored toys and other pieces, and enjoy solving problems and discovering answers. Studies have shown that children remember more things they see than things they experience through their other senses. In current times, many such visual learning toys are two-dimensional on computers, electronic tablets, and cell phones. However, children can still benefit from experiences with three-dimensional toys, involving more senses than sight, and requiring active participation and thinking. The present invention provides such an experience.

SUMMARY OF THE INVENTION

The present invention provides a multi-layer toy having at least one outer layer adjacent a planar layer or a ball where both the outer layer and the adjacent planar layer or ball each contain related information such that, in play, the information on the outer layer is made to align with the related information on the adjacent planar layer or ball. The information can comprise depictions of objects, things or animals, for a matching game, or the information can comprise numbers for a counting or mental math game.

In one embodiment, the toy comprises about two to about five layers, which are each independently rotatable about a central axis holding the layers apart in adjacent parallel planes. These layers each have at least a portion which is transparent to enable viewing of at least a portion of the surface of the adjacent or underlying layer. In one embodiment, the layers are removably affixed to the central axis and are interchangeable. Information is included on each layer that is related to information on the other layers. The layers may be rotated about the axis and aligned for simultaneous viewing of the information on each layer that is related to information on the other layers.

In another embodiment, the toy comprises an opaque, planar layer mounted about a central axis. This opaque planar layer can be stationary and can have a first set of information on its top side and optionally a second set of information on its bottom on underneath side. In this embodiment, at least one upper layer, at least partially transparent, is rotatably mounted about the central axis above the top side of the opaque layer. This upper layer contains a third set of information thereon which is related to the first set of information. Optionally, this embodiment can further comprise at least one lower layer, at least partially transparent, rotatably mounted about the central axis beneath the bottom side of the opaque. This lower layer contains a fourth set of information thereon that is related to the second set of information on the bottom (or underneath) side of the opaque. The upper layer may be rotated about the axis and aligned with the opaque for simultaneous viewing of at least a portion of the first set of information with the related portion of the third set of information or wherein the optional lower layer may be rotated about the axis and aligned with the opaque for simultaneous viewing of at least a portion of the second set of information with the related fourth set of information.

In still another embodiment, the toy of the invention comprises a ball having a surface at least partially visible, and an outer layer at least partially covering or enclosing the surface of the ball. Such outer layer is independently rotatable about the ball and/or the ball can be rotatable independent of the outer layer. At least a portion of the outer layer is transparent to enable viewing of at least a portion of the surface of the ball. Information is provided on the outer layer that is related to information on the surface of the ball In some embodiments, the information on the various layers or surfaces of the toy of the invention is comprised of depictions of objects or things or animals, in whole or in part. Only one object or thing or animal on one layer relates to only one object or thing or animal in an adjacent layer or surface, for a matching game. In other embodiments, the information on the various layers or surfaces is comprised of numbers for a mental math or counting game.

DETAILED DESCRIPTION OF THE INVENTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1:
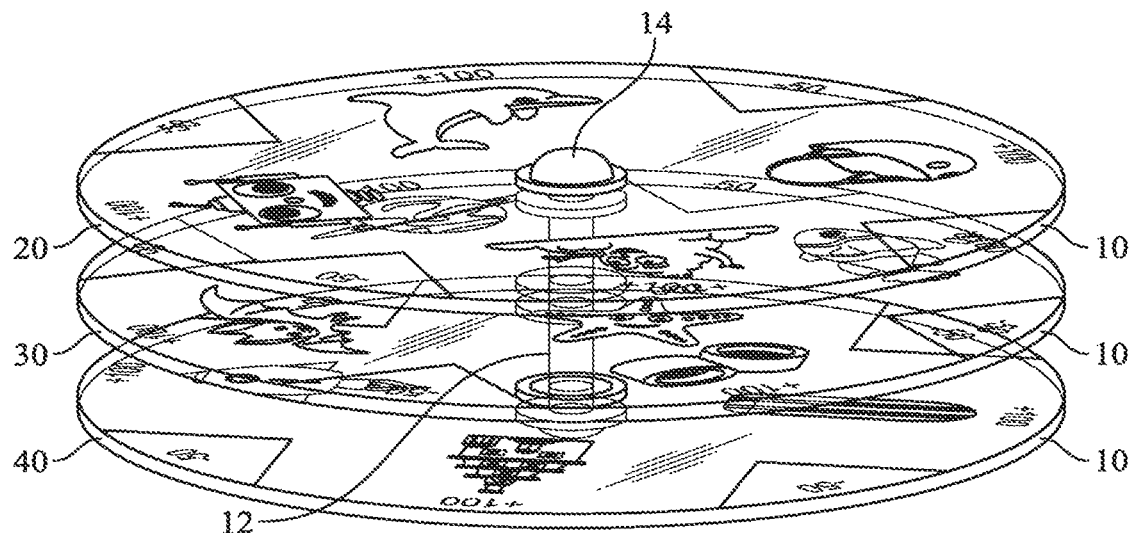
FIG. 1 is a perspective view of one embodiment of the invention having three independently rotatable layers.
Figure 19:
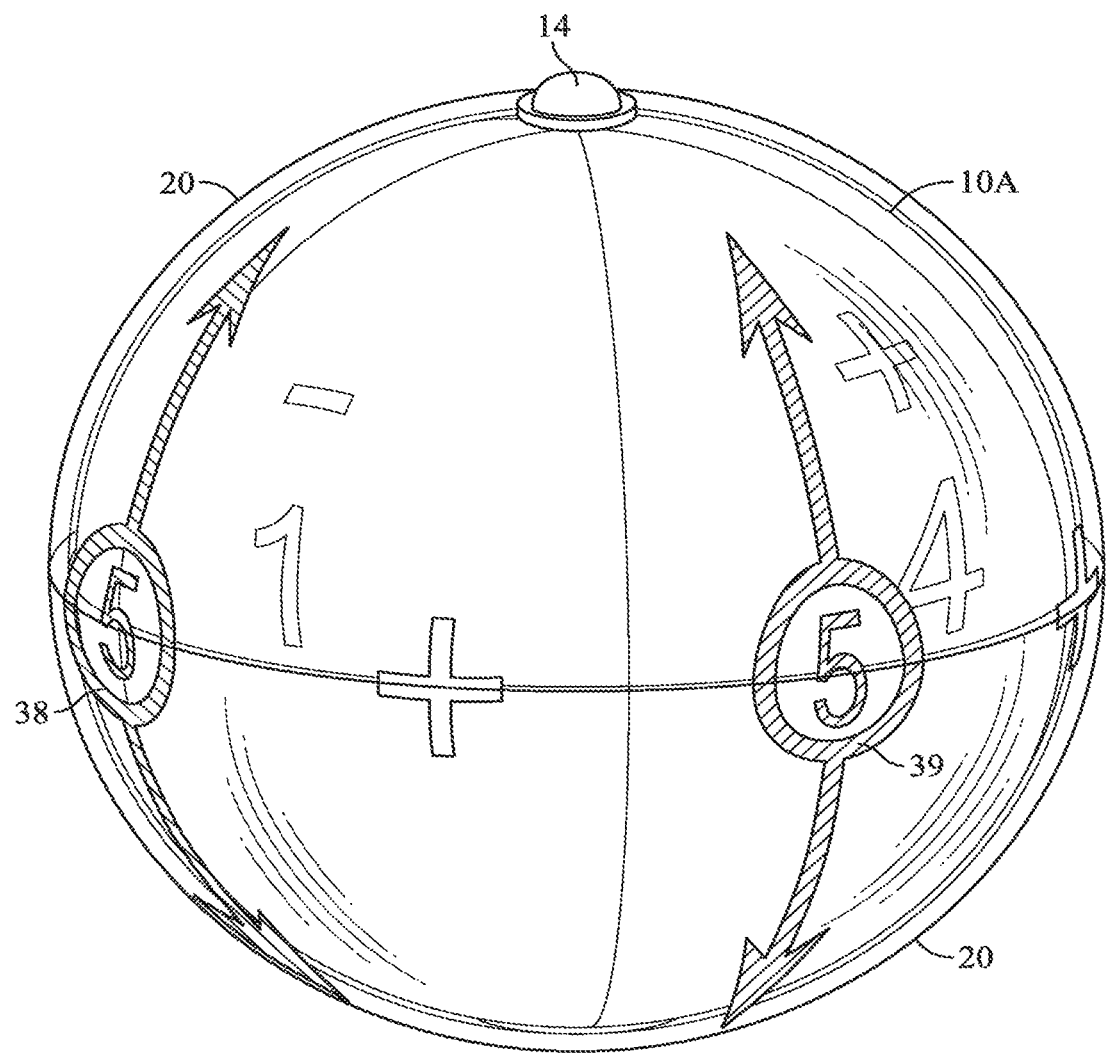
FIG. 19 is a side perspective view of a fourth alternative embodiment of the invention in the form of a ball with an outer covering rotatable about the ball, the ball rotatable within the covering, or both, depicted with numbers for mental math practice or a math game.
Figure 23:
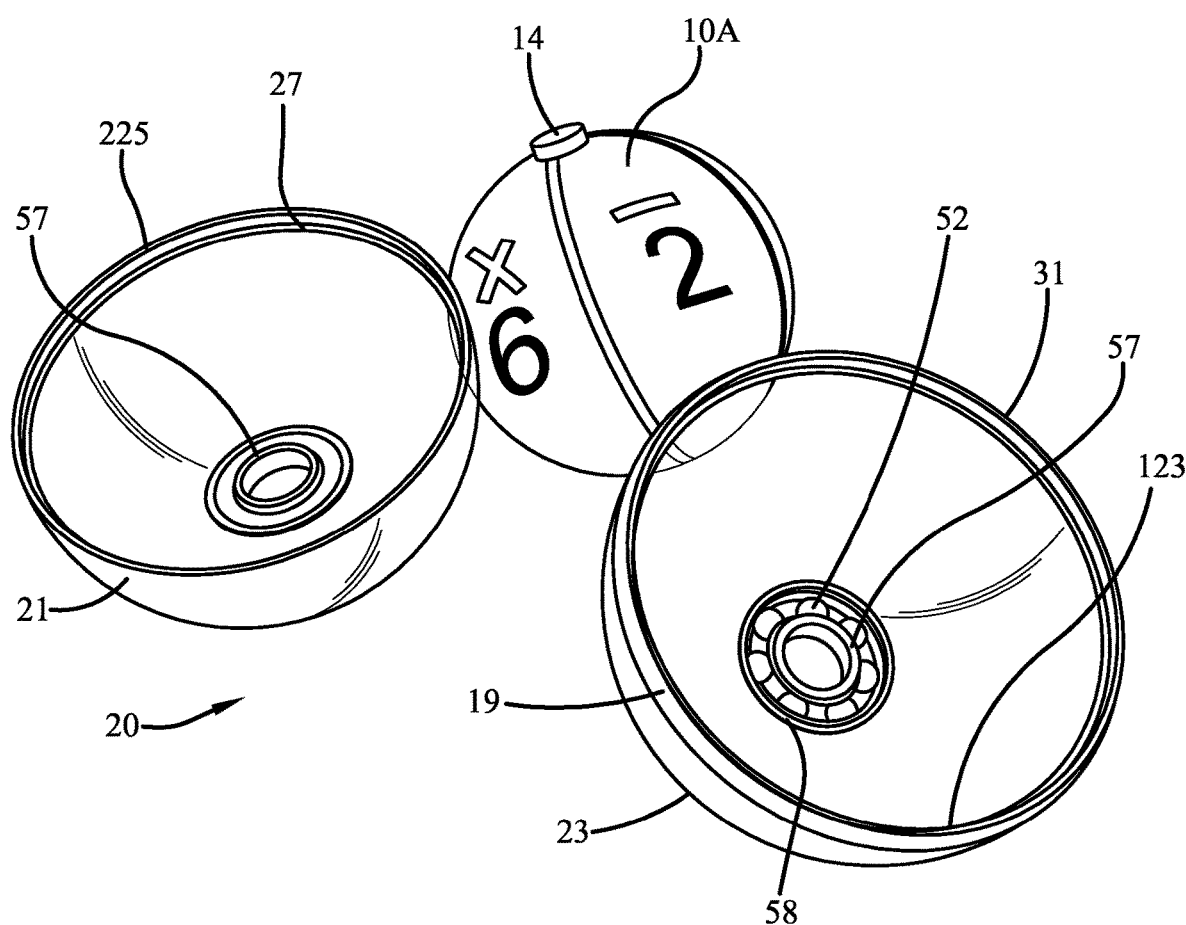
FIG. 23 is a blown apart view of a sixth embodiment of the invention in the form of a ball.

Throughout the present description for the embodiments shown in Figures, the terms "upper", "lower", "top", "bottom", "left", "right", "front", "forward", "rear", and "rearward" shall define directions or orientations with respect to the toy as illustrated in FIGS. 1, 19, and 23. It will be understood that the spatially relative terms "upper", "lower", "top", "bottom", "left", "right", "front", "forward", "rear", and "rearward" are intended to encompass different orientations of the holder in use or operation in addition to the orientation depicted in the figures. For example, if the toy in the figures is turned over, elements described as "upper" elements or features would then be "lower" elements or features.

Throughout the present description, the terms "longitudinal" and "lateral" shall define directions with respect to the toy. The term "longitudinal" shall refer to a direction extending b between the top and the bottom of the toy of FIG. 1. The term "lateral" shall refer to a direction extending transversely across the side of the toy (e.g., from left to right or from right to left as shown in FIG. 1).

Referring to the Figures, an exemplary implementation of the child's activity toy of the present invention provides at least two and preferably about three generally clear or transparent layers or planar boards 10, positioned one above the other with a connection that enables each board 10 to independently rotate around the central connector 12 for the boards 10, as shown for example in FIG. 1. Such connection may be accomplished in various ways, such as, for non-limiting example, by snap rivets, brads, rollable magnets, nuts and bolts, pegs, ball bearings, or various combinations of these, as will be further discussed below. The boards 10 are preferably circular discs 16 as shown in the FIGS. 1-18, although they could alternatively be oval, oblong, square, triangular, star-shaped, or any number of different planar shapes. Alternatively, in another embodiment of the invention, the boards have non-planar shapes, such as for non-limiting example, spherical 10A, as shown in FIGS. 19-22. The boards can all be the same shape per toy, as shown for example in FIG. 1, or can vary one from another in the same toy, as shown for non-limiting example in FIGS. 10, 12, and 13, where the middle layer or board has a different shape than the circular top and bottom layers or boards 10.

In some embodiments, such as shown for non-limiting example in FIGS. 1-9, the boards are preferably held to one another in a one-above-the-other configuration, using a snap rivet or snap-rivet type connector 14.

The boards 10 are made of hard, transparent plastic in one embodiment, as shown in FIGS. 1-9, 11, and 15-17. In another embodiment, the boards 10 are opaque, as shown for example in FIGS. 12 and 18, and the spherical body shown in FIGS. 19-22

Optionally, planar, opaque boards 10 can have holes or transparent viewing windows (not shown) for viewing the surfaces of adjacent boards. In still another embodiment, the boards 10 or cover 20 include one or more miniature magnifying glasses 15 for easier viewing of the surfaces on the boards 10 and 10A.

Figure 2:
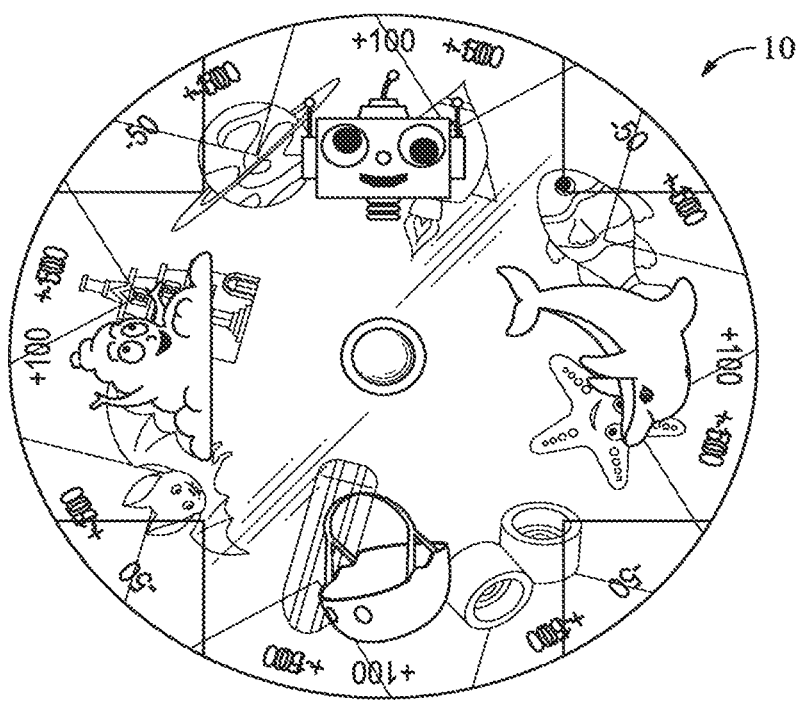
FIG. 2 is a top view of the embodiment of FIG. 1.
Figure 3:
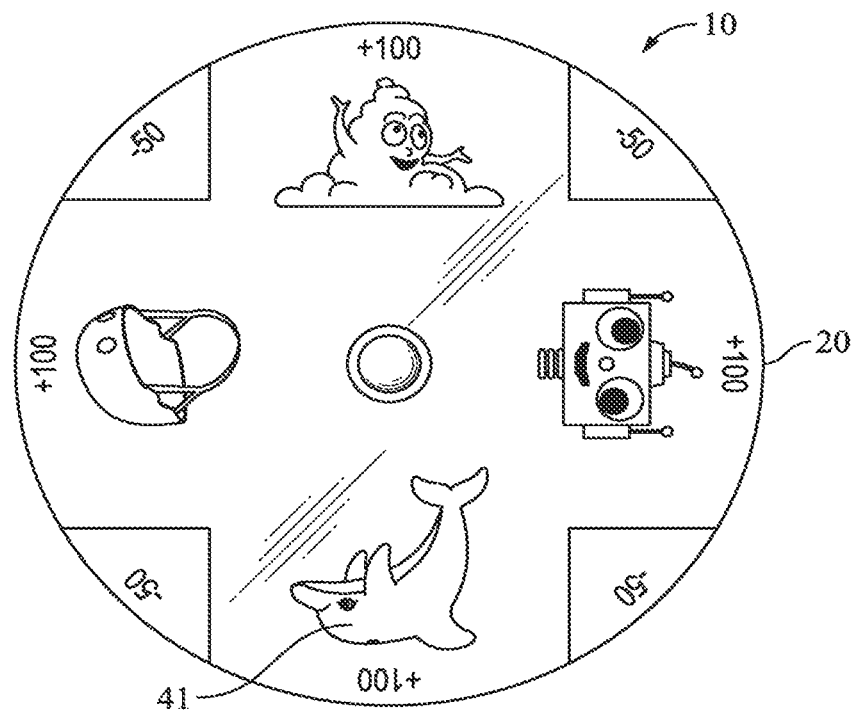
FIG. 3 is a top view of the top or first layer of the embodiment of FIG. 1.
Figure 4:
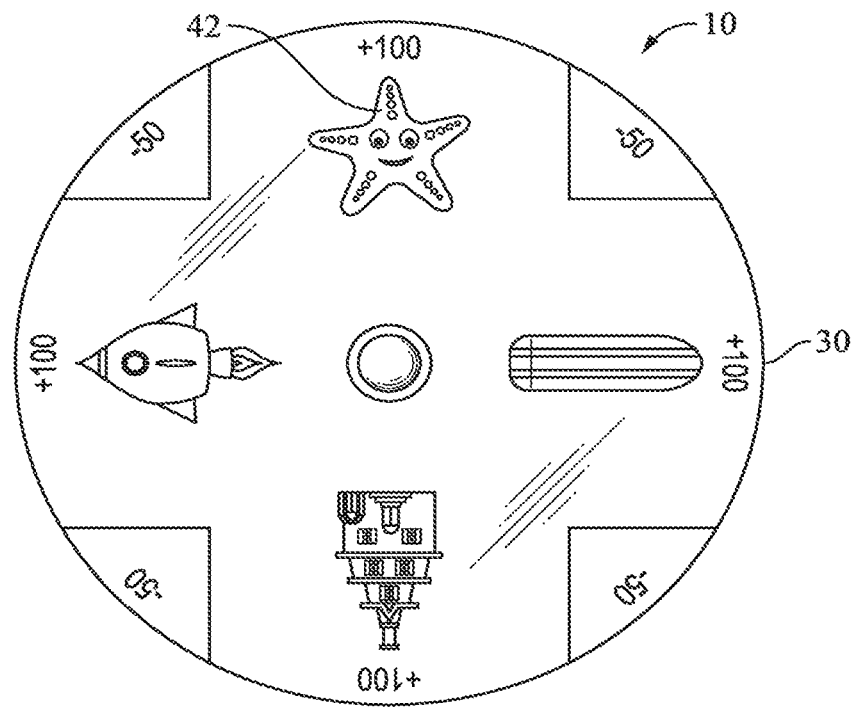
FIG. 4 is a top view of the middle or second layer of the embodiment of FIG. 1.
Figure 5:
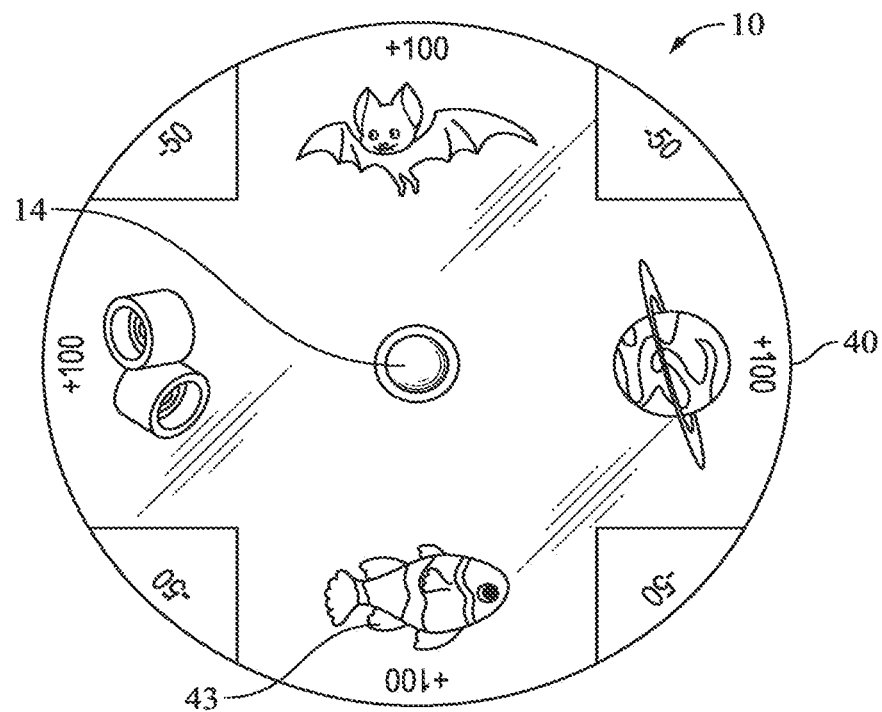
FIG. 5 is a top view of the bottom or third layer of the embodiment of FIG. 1.

On at least the "top" surface 11 of each of the boards 10, that is, the surface 11 that is facing or readily visible to the user of the invention, are various figures depictions 16 of animals, characters, inanimate objects or shapes, or letters, words, or names; or numbers 25, for non-limiting example—that have a relationship to different or other figures depictions 16 or numbers 25, (or letters, or words, or names, not shown)—on the other boards 10, as shown in FIGS. 1-18. For example, a first board might have a saddle, the second one a bridle, and the third one a horse; or for another example, a first board might have a cup, the second one a saucer, and the third one a teapot; or for still another example, a first board might have a dog, a second board might have a cat, and the third board might have a hamster (all pets). For another example, referring to FIGS. 1-5, a dolphin 41 on the first board or layer 20 (FIG. 3) lines up with a star 42 fish on the second board or layer 30 (FIG. 4), which lines up with a fish 43 on the third board or layer 40 (FIG. 5), all together one behind the other or matched as shown in FIG. 2, all showing sea creatures. That is, the figures—the depictions or numbers—on the boards 10 are matchable or related to the figures—the depictions or numbers—on the other boards. Each figure—depiction or number—on board 10 has a best match with or corresponds to a figure—depiction or number—on at least one other board. The best matching or corresponding figures on each board can line up so that they are under one another, or in-line (or aligned), on the boards.

Thus, when a toy of the invention is in use, a child chooses a figure—a depiction 16 or number 25—on a board 10 and turns the other boards 10 so that the "best match" on each of the other boards 10 is lined up above or below that first chosen figure. An advantage of the toy of this invention is that the game can be played alone or by two or more persons together. The game is preferably sized so as to fit in a child's hand for travel play, but larger versions are desirable for playing on a table or for installing on a wall or window. Thus, the actual size of the toy of the invention can typically range from about one inch in diameter to two to four feet in diameter (or more if practical for the space containing the invention). The larger sizes are particularly suited for classroom use.

Figure 6:
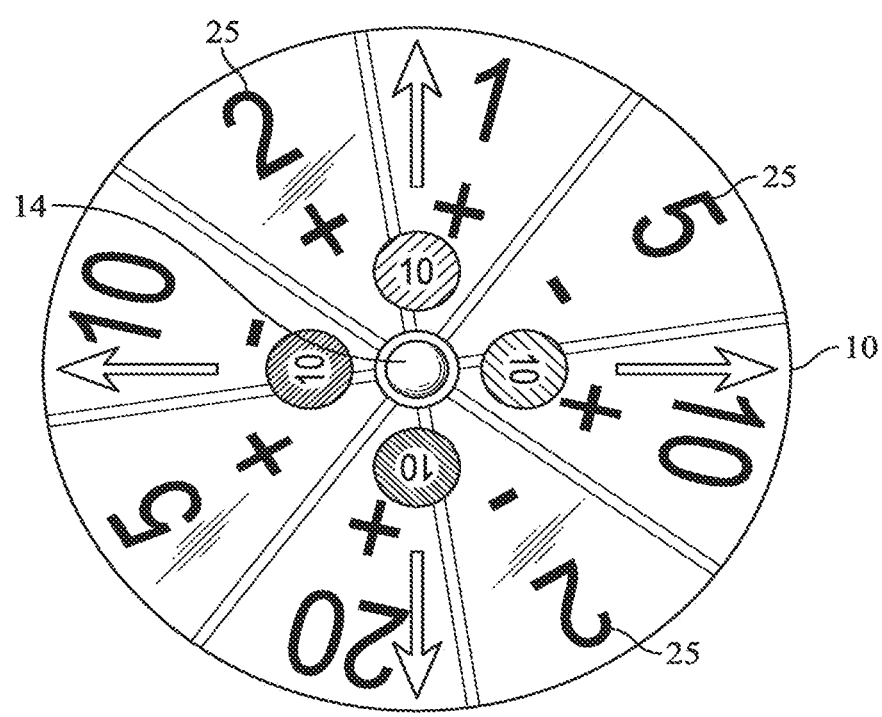
FIG. 6 is a top view of a first alternative embodiment showing depiction of numbers for use of the invention for mental math practice or a math game.
Figure 7:
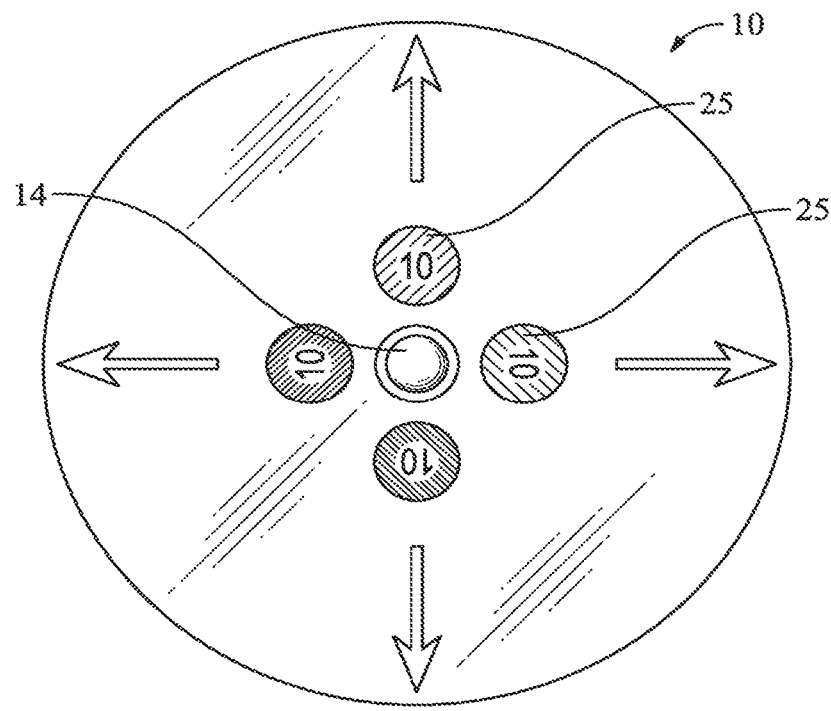
FIG. 7 is a top view of a top or first layer of the embodiment of FIG. 6 with the connector installed through the first layer.
Figure 8:
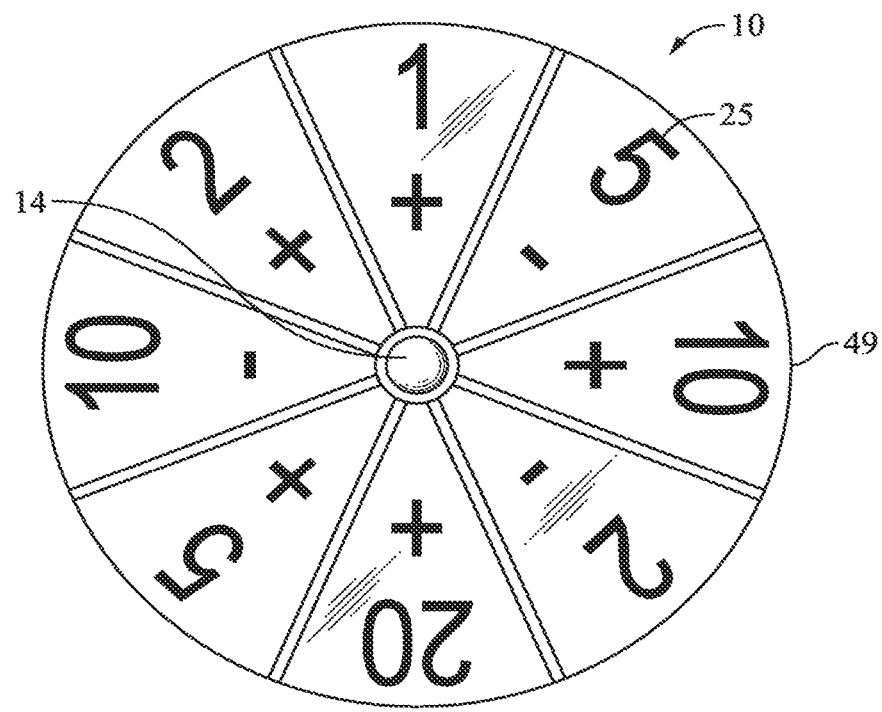
FIG. 8 is a top view of an underlying or second layer of the embodiment of FIG. 6 with the connector installed through the second layer.
Figure 9:
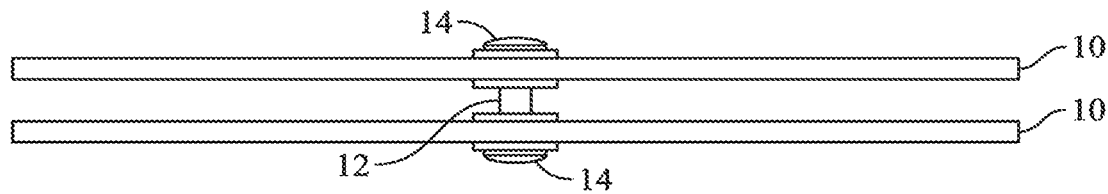
FIG. 9 is a side view of the embodiment of FIG. 6.
Figure 20:
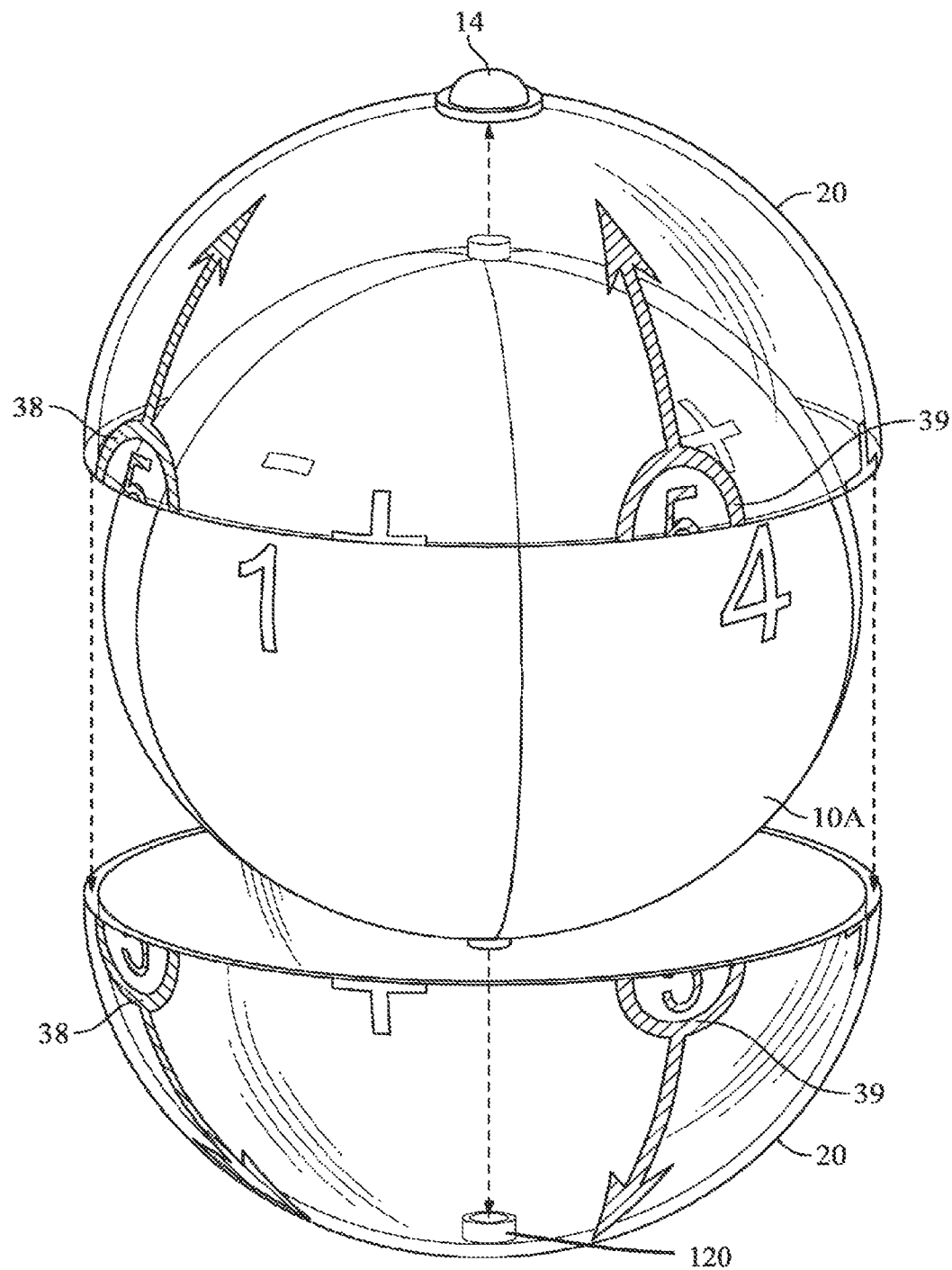
FIG. 20 is a blown apart view of the embodiment of FIG. 19.

Some alternative embodiments of the present invention to that shown in FIGS. 1-5 comprise all numbers 25, as shown for example in FIGS. 6-8, and for another example in FIGS. 10-14, and for another example in FIGS. 15-18, and for still another example in FIGS. 19-20, instead of depictions 16 on the boards 10 as shown in FIGS. 1-5. The numbers 25 on the embodiment of boards of FIGS. 6-8, are arranged for a mental math and competition game. In this embodiment of the invention, shown in FIGS. 6-8, a two layer board is provided that allows for multiple functions of math to be done as a game, or for practicing mental math. Depending on the turn of the board or wheel, one might add or subtract a number as provided in this example. The game could be played with one, two, three or four persons, each taking his or her turn and determining who gets the highest (or lowest) total value added or subtracted as provided by the wheel, preferably over multiple rounds. The diameter of the base or second layer is wider than the top layer so that the information of the edge of the bottom layer can be seen easily.

In the embodiments of FIGS. 10-18, the numbers 25 are positioned such that the boards 10 can become in a sense a calculator. Specifically, referring to the FIGS. 10-18, one can see how the boards 10 can be used to add, subtract, multiple and divide—finding the answers by lining up numbers on the boards, as will be further described for example below.

Figure 10:
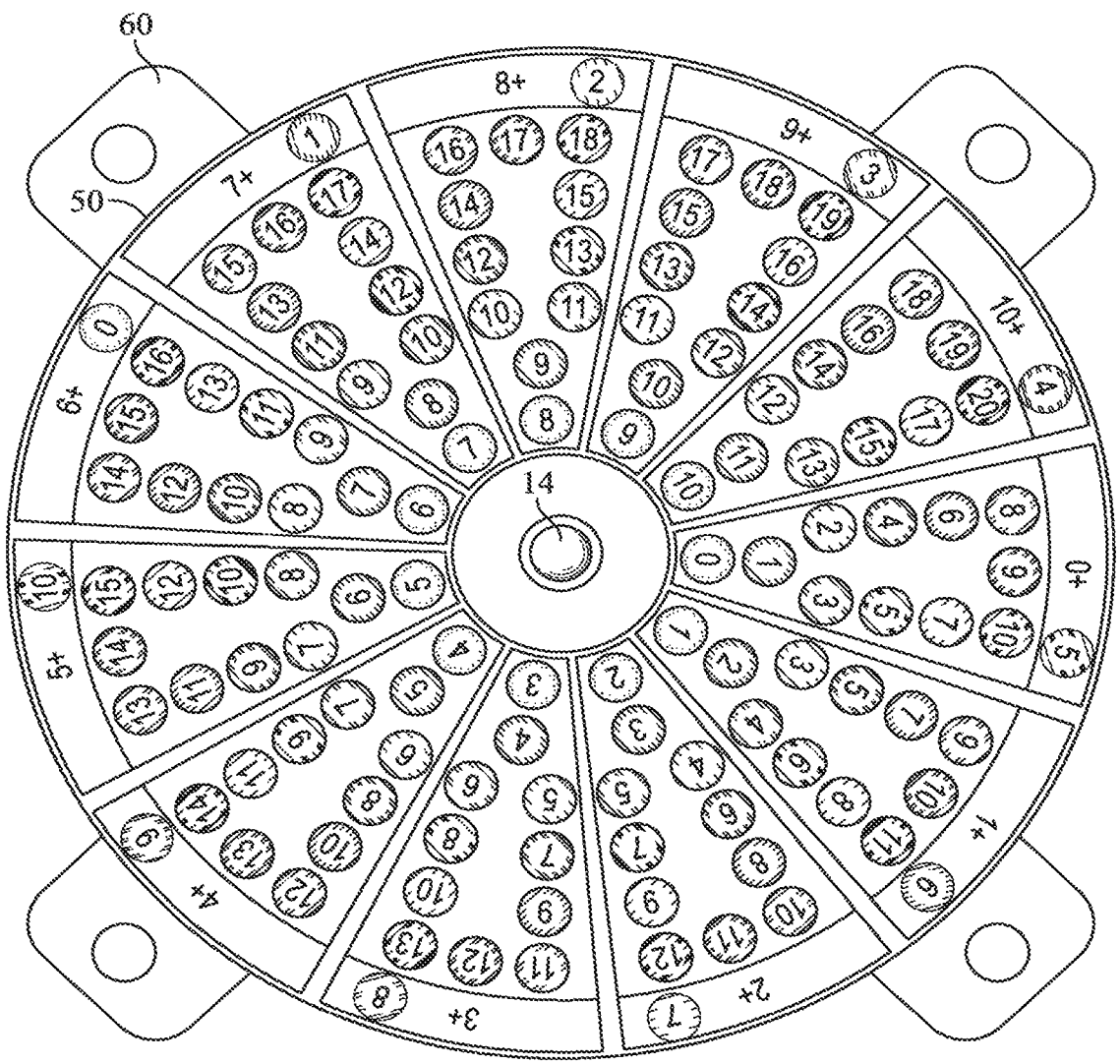
FIG. 10 is a top view of a second alternative embodiment of the invention having a stationary opaque middle layer, transparent top and bottom independently rotatable layers, the top layer marked with numbers for addition calculations and the bottom layer marked with numbers for subtraction calculations. The bottom layer is not seen in this FIG. 10 but is shown in FIGS. 13, 14, and 15.
Figure 11:
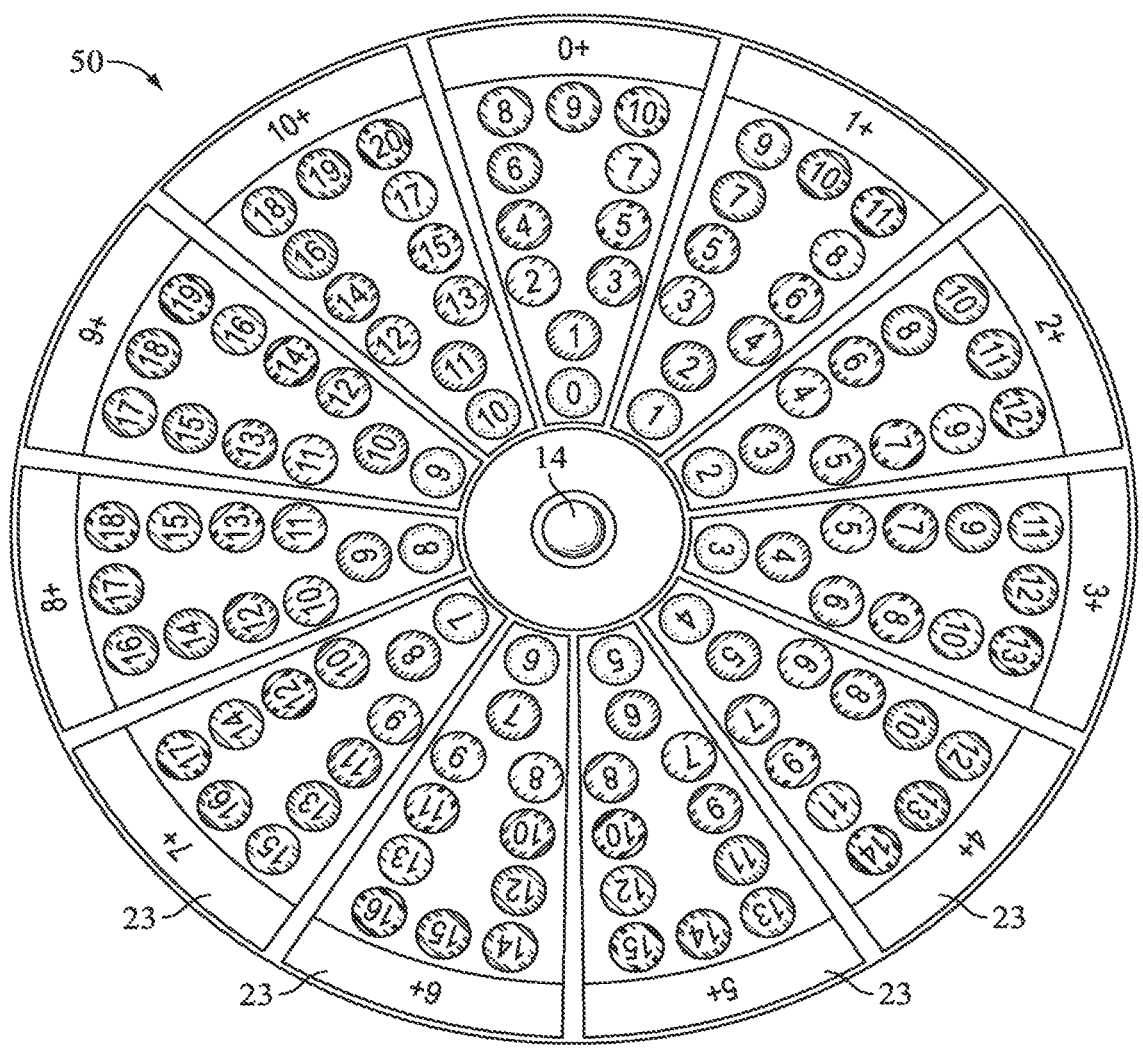
FIG. 11 is a top view of the top layer of the embodiment of FIG. 10.
Figure 12:
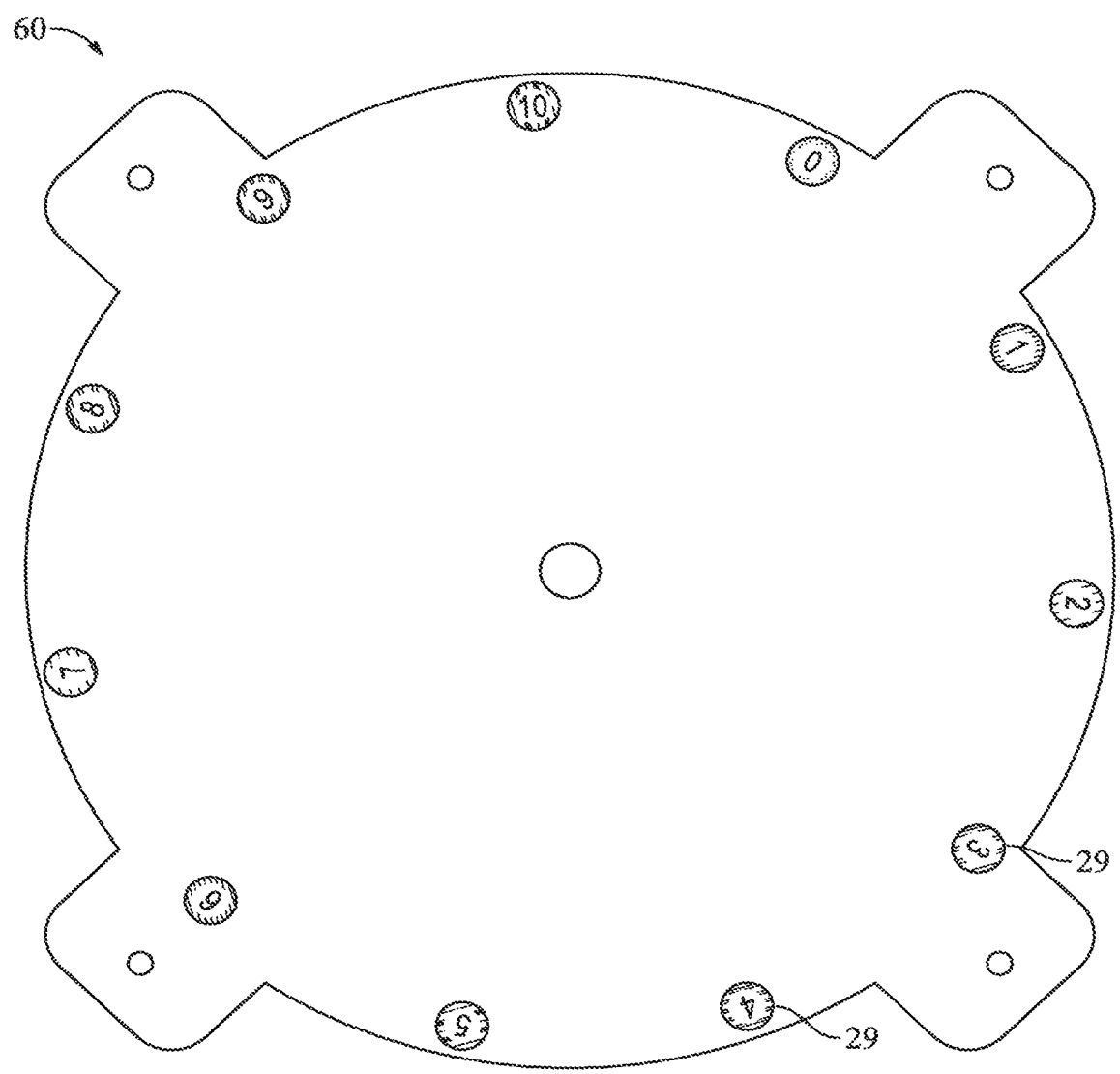
FIG. 12 is a view of the stationary middle layer of the embodiment of FIG. 10 apart from the top and bottom layer or with the top and bottom layers removed.
Figure 13:
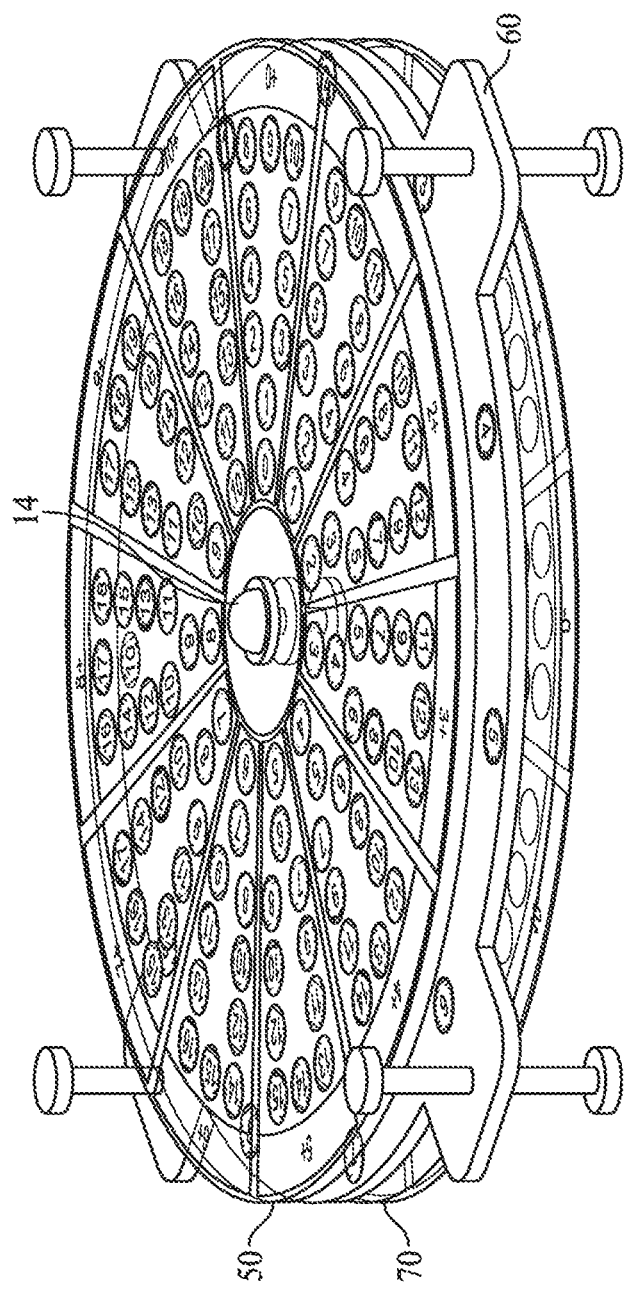
FIG. 13 is a perspective view of the embodiment of FIG. 10.
Figure 14:
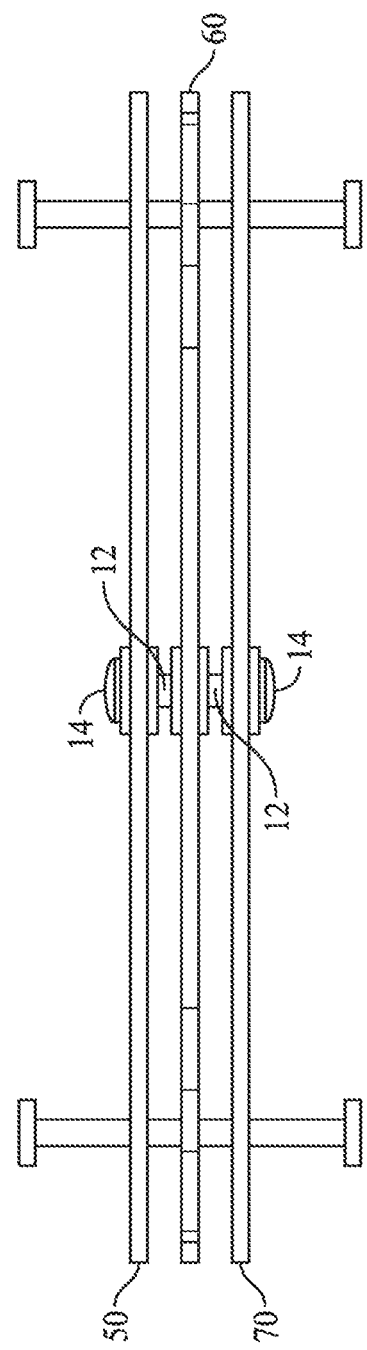
FIG. 14 is a side view of the embodiment of FIG. 10.

That is, referring more specifically to FIGS. 10-12, the first or top-most board 50 is transparent and contains colorful numbers or dots bearing numbers shown proceeding inwardly toward the center of the board 50, which is circular in shape in this embodiment, from a blue line or lines around the outer perimeter 23 of the board 50, as shown in FIG. 11. This first board 50 is positioned or mounted on a connector 14 that is itself rotatable or allows for rotation of the board 50 independently of the connector 14 rotation. The connector in the embodiment shown in the Figures is a snap rivet. The connector 14 also connects a bottom or second board 60 which contains colorful numbers or numbers on colorful dots positioned around the outer circumference 29 of the board, as shown in FIG. 12. The top board 50 contains the answers. When the top board 50 is turned, any number above the blue line along the perimeter 23 can be lined up with any number on the outer circumference 29 of the second board 60 for an answer following the sign of addition, subtraction, division, or multiplication, and the color of the bottom board. For example, if number "1+" on the top board 50 is lined up with number "4" in the same color (e.g., red) of the number on the second board 60 lined up with that number "1+", then the answer would be the number on the same section of the number "1+" on the top board 50 and the same color of the number on the second board 60 which was lined up with the "1+". The answer would be number "5" on the top board 50, which is "5" in red, the same color of the number on the second board 60.

For another example, if one wanted to find the sum of two plus two, one would rotate top board 50 to line up the part of the outer perimeter 23 on board 50 that has the number "2+" with the part of the second board 60 which has "2" (in pink color) and then look for the answer on the top board 50 based on the color of the number "2" on the board 60. Since the color of "2" on board 60 was pink, one would look for a number on the top board 50 in the said section "2+" that had the same color—the color pink in this example. That number in pink is 4 indicating the answer or sum of "2 plus 2." This number "4" in pink is the only one in the section "2+" that is pink. In this manner, to calculate using the toy, one needs only to follow the sign of addition, subtraction, division, multiplication, and the colors which are shown/described on the boards.

Another way to find the sum of two plus two using the embodiment of the invention shown in FIGS. 11-12 is by counting numerical, colored spots of the section that has "2+" on the outer perimeter 23 of top board 50. The user counts from the center of the board 50 toward the edge (outward), and including zero (in yellow) as a number. That is, the user rotates board 50 to line up the "2+" on the outer perimeter 23 of top board 50 with the number 2 (in pink) on the second board 60. Next the user counts three spots from the center, because the user needs to include zero as the first number and then two more spots based on the number 2 (in pink) on the second board 60. The answer then is 4 (in pink), which is the third spot on board 50 in the "2+" section of that board 50.

Figure 15:
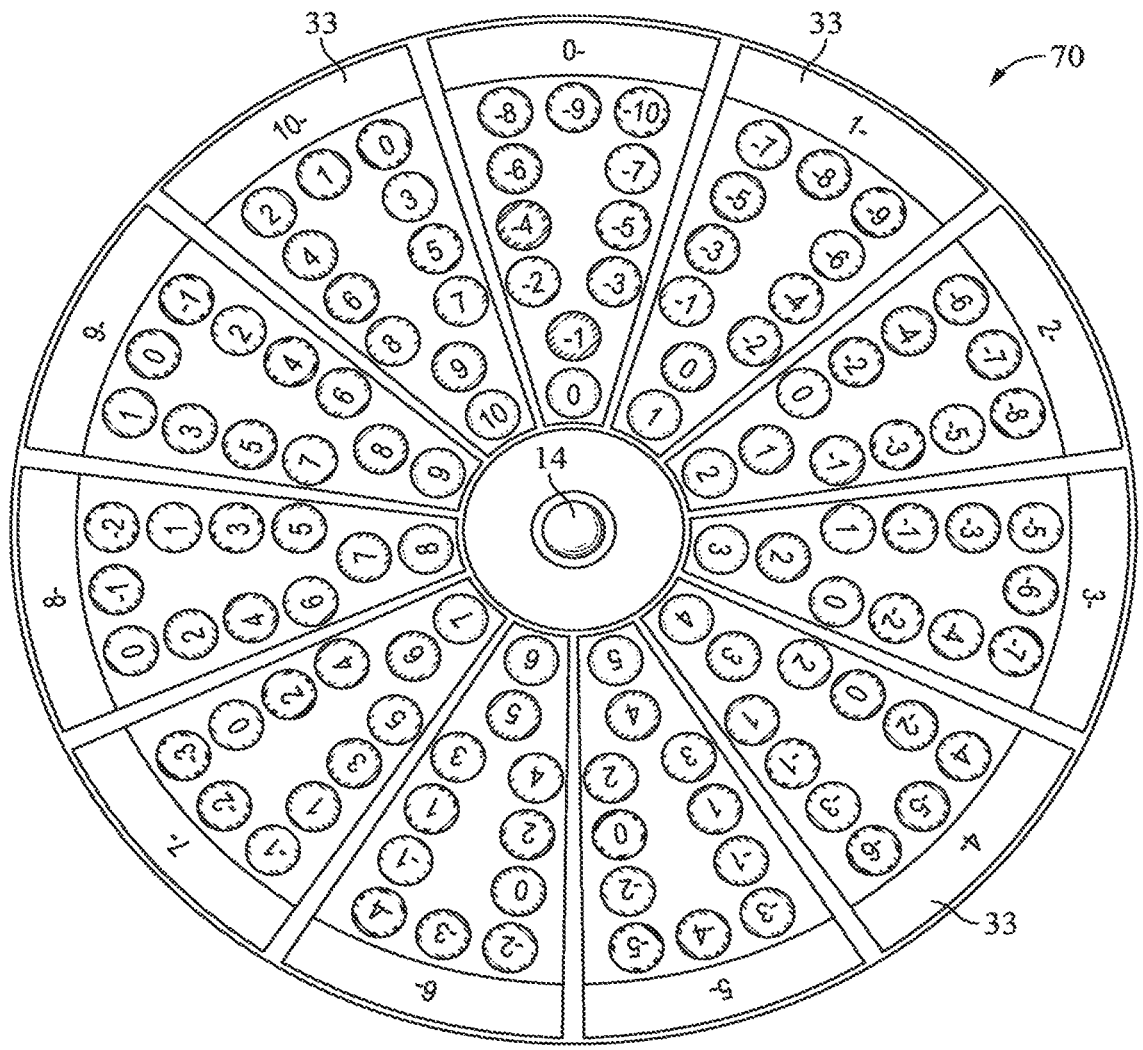
FIG. 15 is a bottom view of the embodiment of FIG. 10, showing the third or bottom layer, which becomes a second, alternative, "top" layer for the embodiment of FIG. 10 when the embodiment is turned upside down.
Figure 18:
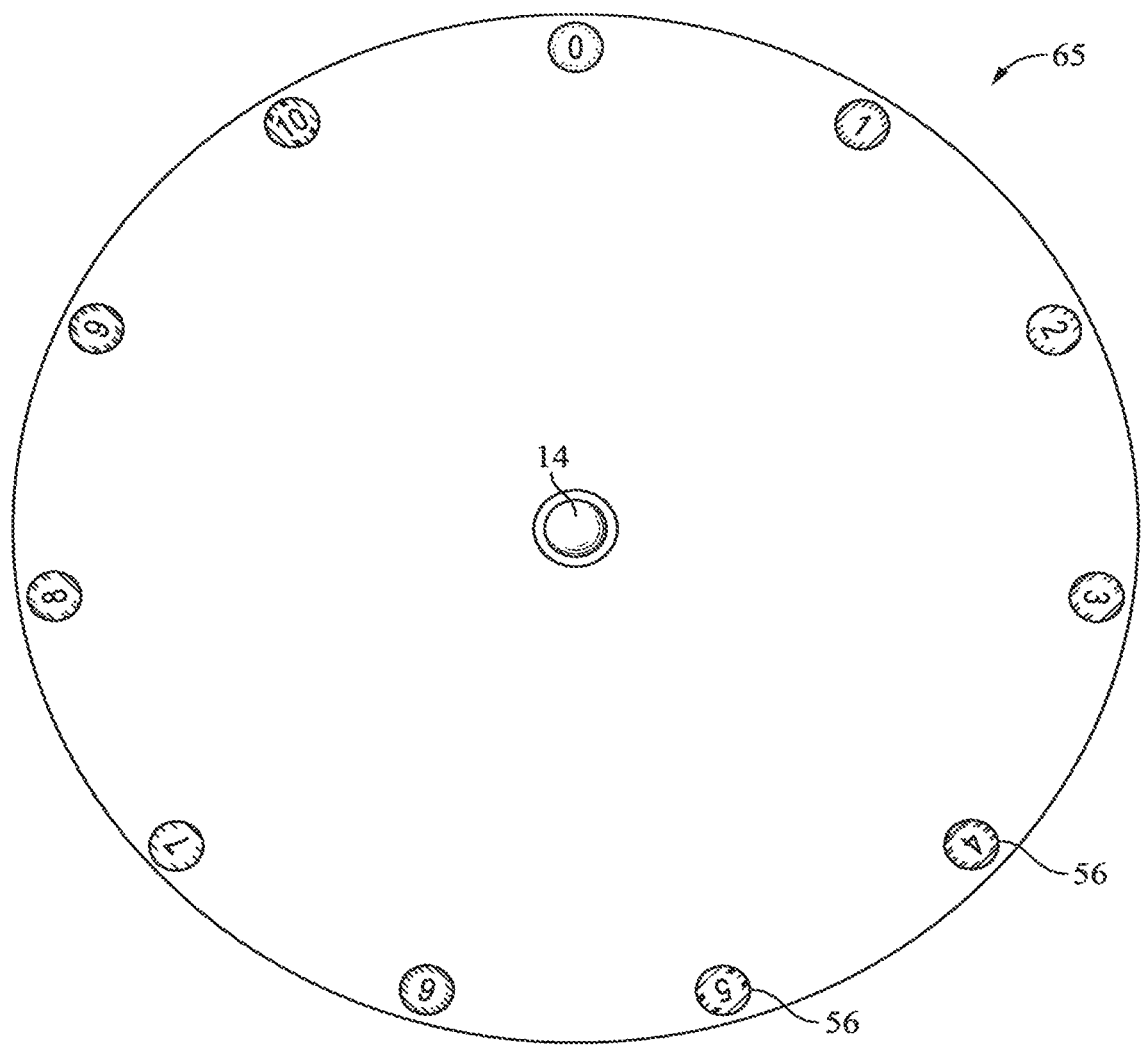
FIG. 18 is a top view of an alternative or underlying stationary layer that may be used with alternative top layers shown in FIG. 11, 15, 16, or 17, in a two-layer configuration as shown in FIG. 9, to comprise a third alternative embodiment of the invention, having two layers with number patterns for use of the invention for mental math practice or a math game.

For subtraction, using board 70 in FIG. 15 with boards 60 in FIG. 12 or board 65 in FIG. 18, board 70, the top board, will have the answers. Thus, for example, to subtract the number ten from the number ten, the user would rotate top board 70 to line up the section "10−" in the outer perimeter 33 of board 70 with the number "10" in hot pink color on the underlying or second board 12 or outer perimeter 56 of board 65. One would then look for the answer on the top board 70 based on the color of the number "10" on the second board 12 or 65. Since that color is hot pink, the answer would be zero, as zero is the number in section "10−" on board 70 that is that same color, hot pink.

Another way to find the answer to ten minus ten is by counting numerical, colored spots (circles on board 70) in the section "10−" on the outer perimeter 33 of board 70. The user begins by counting from the center of board 70 toward the outer perimeter 33. Zero is counted as a number. The user rotates top board 70 and lines up the "10−" section in the outer perimeter 33 with the number "10" on the second or underlying board 12 or 65. Beginning at the center of board 70, one counts the spots until one reaches a number with the same color as the number "10" on the second board 12. That number is "zero.'

Figure 16:
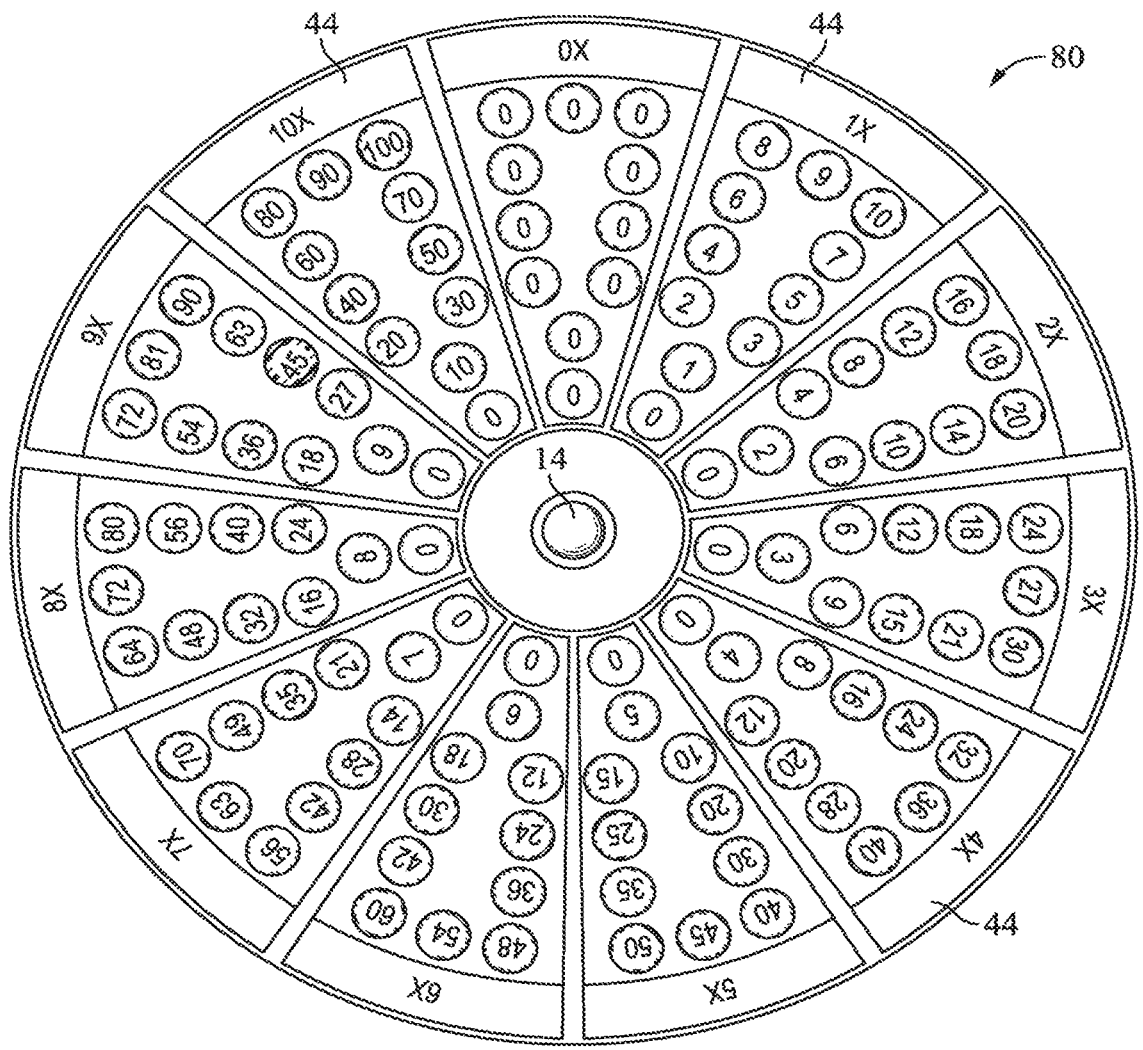
FIG. 16 is a third, alternative, top layer for the embodiment of FIG. 10, marked with numbers for multiplication calculations.

For multiplication, using board 80 in FIG. 16 with board 65 in FIG. 18, board 80, the top board, will have the answers. Thus, for example, to multiply the number three times the number three, the user would rotate top board 80 to line up the section "3×" in the outer perimeter 44 of board 80 with the number "3" in lime green color on the underlying or second board 65. One would then look for the answer on the top board 80 based on the color of the number "3" on the second board 65. Since that color is lime green, the answer would be nine as nine is the number in section "3×" on board 80 that is in that same color, lime green.

Another way to find the answer to three times three is by counting numerical, colored spots (circles on board 80) in the section "3×" on the outer perimeter 44 of board 80. The user begins by counting from the center of board 80 toward the outer perimeter 44. Zero is the first spot and is counted as a number. The user rotates top board 80 and lines up the "3×" section in the outer perimeter 44 with the number "3" on the second or underlying board 65. Beginning at the center of board 80, one counts the spots, with zero as the first spot, and then three more spots, until one reaches a number with the same color as the number "3" on the second board 65. That number is "nine," the fourth spot.

Figure 17:
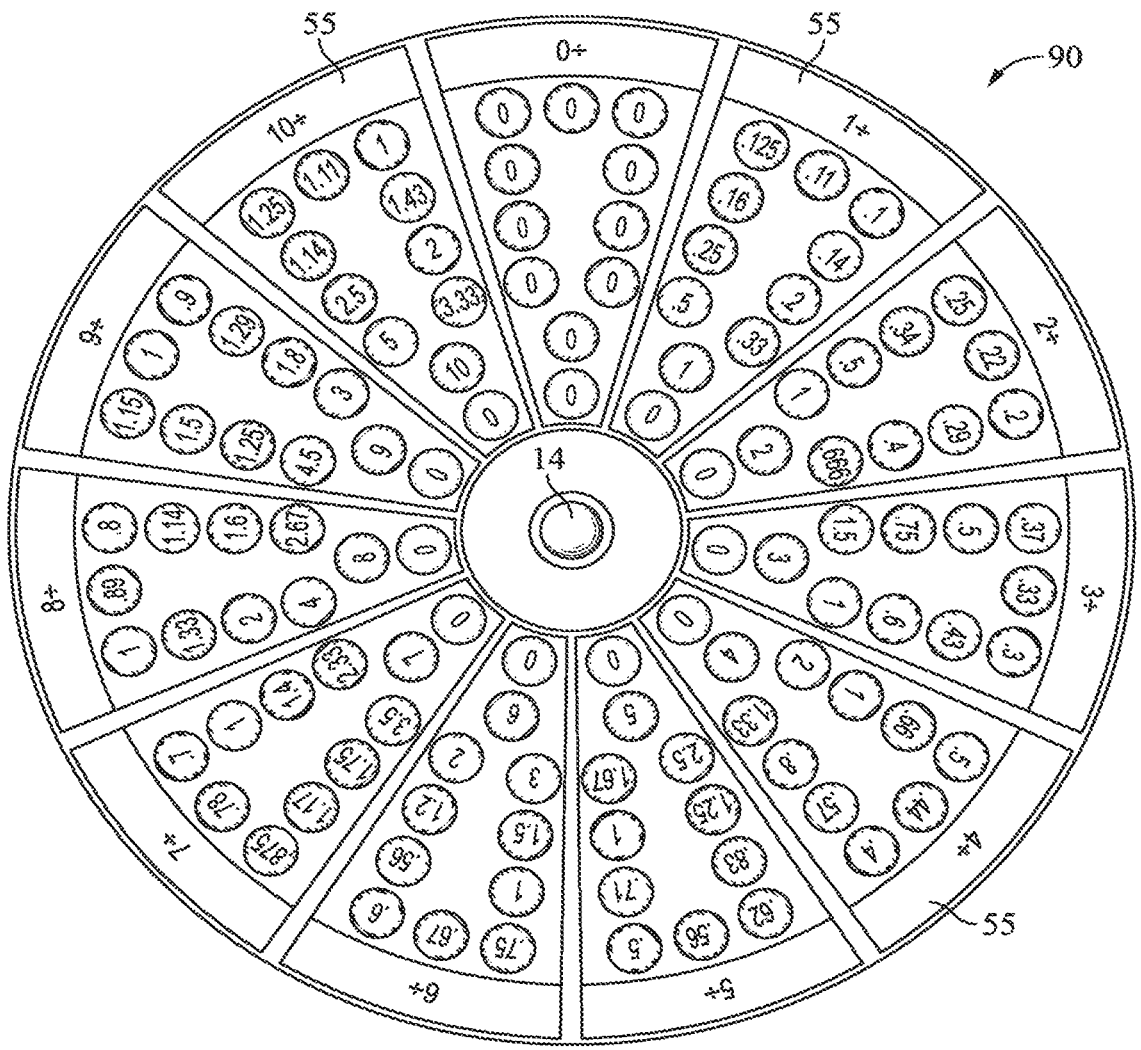
FIG. 17 is a fourth, alternative, top layer for the embodiment of FIG. 10, marked with numbers for division calculations.

For division, using board 90 in FIG. 17 with board 65 in FIG. 18, board 90, the top board, will have the answers. Thus, for example, to divide the number nine by the number nine, the user would rotate top board 90 to line up the section "9/" in the outer perimeter 55 of board 90 with the number "9" in green color on the underlying or second board 65. One would then look for the answer on the top board 90 based on the color of the number "9" on the second board 65. Since that color is green, the answer would be one as one is the number in section "9/" on board 90 that is in that same color, green.

Another way to find the answer to nine divided by nine is by counting numerical, colored spots (circles on board 90) in the section "9/' on the outer perimeter 55 of board 80. The user begins by counting from the center of board 90 toward the outer perimeter 55. Zero is the first spot and is counted as a number. The user rotates top board 90 and lines up the "9/" section in the outer perimeter 55 with the number "9" on the second or underlying board 65. Beginning at the center of board 90, one counts the spots, with zero as the first spot, and then nine more spots, until one reaches a number with the same color (green) as the number "9" on the second board 65. That number is "one," the tenth spot.

Referring to FIGS. 19-22, embodiments of the invention are illustrated where the toy is in the form a ball or spherical shape rather than a flat, planar shape. Although in FIGS. 19-22, outer cover 20 is shown to be transparent (and is typically comprised of plastic) and to completely envelope or surround ball 10A, in some other embodiments, outer cover 20 could be opaque with a window such as for example window 15 in FIG. 21 for viewing the ball 10A or could be transparent but only partially cover the ball 10A. The ball 10A is preferably opaque (and is typically comprised of plastic for lightness of weight but could also be comprised of another synthetic material or of wood, metal. In the toy of FIGS. 19 and 20, the ball 10A has 4 different sections each with a number and operand sign (e.g. plus, minus, multiplication, division etc.). Alternatively, the ball may have less than or more than 4 sections such as 6 or 10 sections. The outer cover 20 has different color spots with numbers inside arrows.

A connector 14 such as a snap rivet holds cover 20 via bearing 120 to the ball 10A and allows cover 20 to rotate about the ball 10A. Preferably the ball 10A is also rotatable, and is independently rotatable within cover 20. The outer cover 20 may comprise upper and lower shells 21, 23 that are removably attached to each other. For example, the upper and lower shells 21, 23 may be press fitted or friction fitted together. Specifically, as seen in FIG. 23, the upper shell 21 may include an outer peripheral lip or extension 225 extending from the lower end 27 of the upper shell 21. The lip 225 is received in an outer groove or recess 19 defined by an inner lip or extension 123 of the upper end 31 of the lower shell 23 and secure therein by friction.

Figure 36:
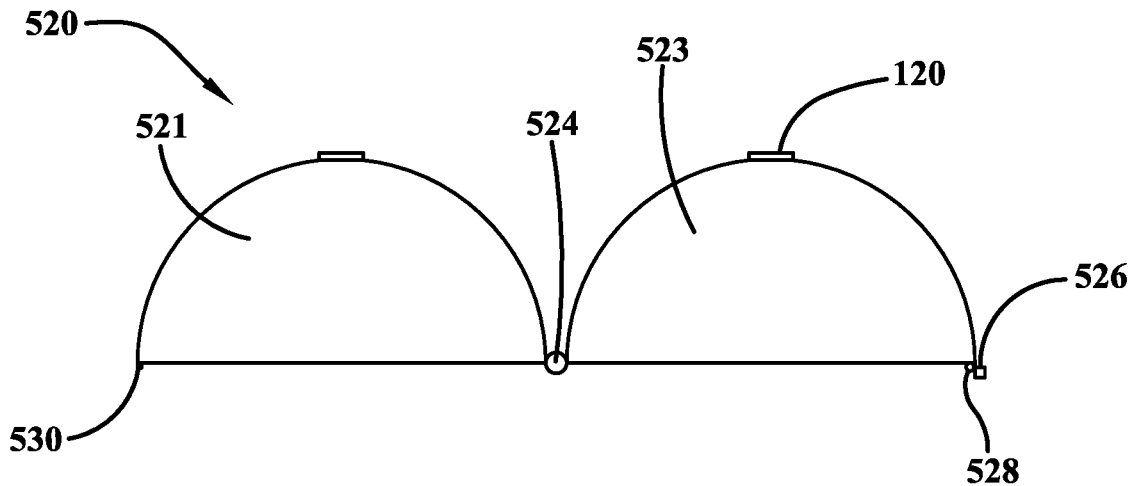
FIG. 36 is a side view of a first alternative version of the ball of the embodiments of the ball type toys of the present invention.
Figure 43:
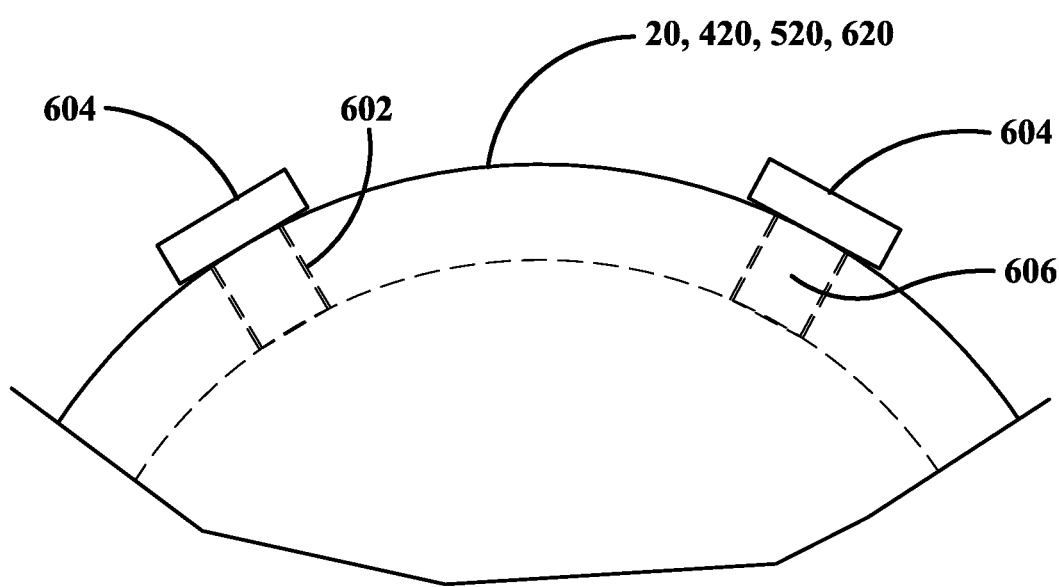
FIG. 43 is a side view of portion of a version of the upper cover for embodiments of the ball type toy according to the present invention.

FIG. 36 shows an alternative outer cover 520. The outer cover 520 may comprise upper and lower shells 521, 523 that are removably attached to each. In particular, the upper and lower shells 521, 523 are pivotally connected to each other by a hinge 524. A knob 526 is attached to the upper end of the lower shell 523 and includes a projection 528. A recess 530 is formed in the lower end of the upper shell 521 at a location opposite that of the hinge 524. When the upper and lower shells 521, 523 are attached together, the projection 528 engages a recess 530 formed in the lower end of the upper shell 521 to snap connect the lower shell 523 (in phantom lines) to the upper shell 521. To remove that upper shell 521 from the lower shell 523, a user grasps the knob 526 and pulls away from the upper shell 521 with sufficient force to disengaged the projection 528 from the recess 530 and pivot the lower shell 523 away from the upper shell 521. The outer cover 520 may have apertures for receiving charms as illustrated in FIG. 43.

In play, the embodiments of the invention of FIGS. 19-20, 23 and 24 are shown for a math game, for example, for two persons or teams. One person or team selects a color and spot 38 for chasing (different from the other person or team's color and spot for chasing, such as for example spot 39) on cover 20. The teams begin with 10 points. After the rotation, the chasing team looks to see where its chasing spot lines up with the underlying ball 10A. In FIG. 19, the person or team chasing spot 38 would have "9" as its spot 38 is in the section of ball 10A showing a minus one, (and that person or teach thus subtracts one from its beginning 10 points) and the person or team chasing spot 39 would have "14" as its spot 39 is in the section of board or ball 10A showing a plus 4 (and that person or team thus adds four to its beginning 10 points). In some embodiments, ball 10A may have multiple numbers in a section of its surface so that multiple calculations are conducted by each person or team for each rotation. The rotations are continued with the persons or teams alternating as to which one makes the rotation, until one person or team reaches a total of 100 points and is the winner. As many persons or teams may play as there are different colored chasing spots on the cover 20.

Figure 21:
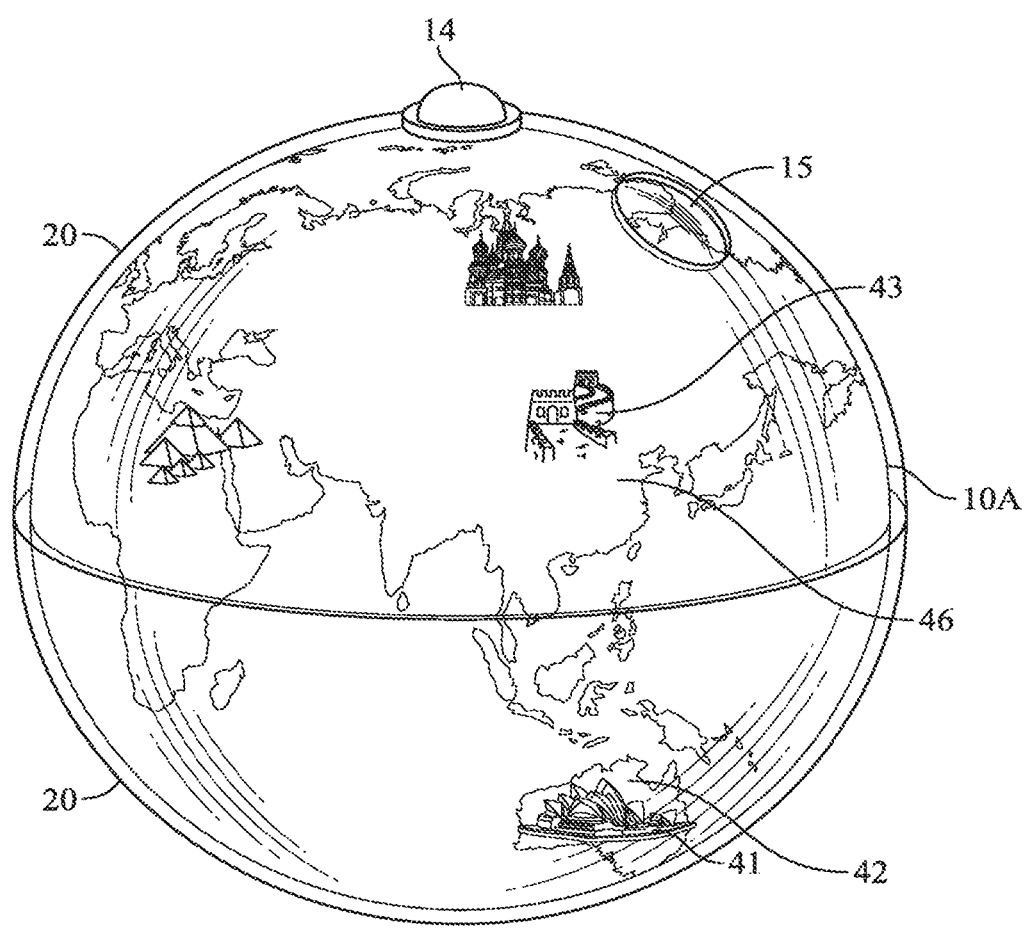
FIG. 21 is a side perspective of a fifth alternative embodiment of the invention in the form of a ball with at least an outer covering about the ball, such that the ball may be rotated within the covering, or the covering may be rotated about the ball, or both, illustrated with pictures of places for a matching game.
Figure 22:
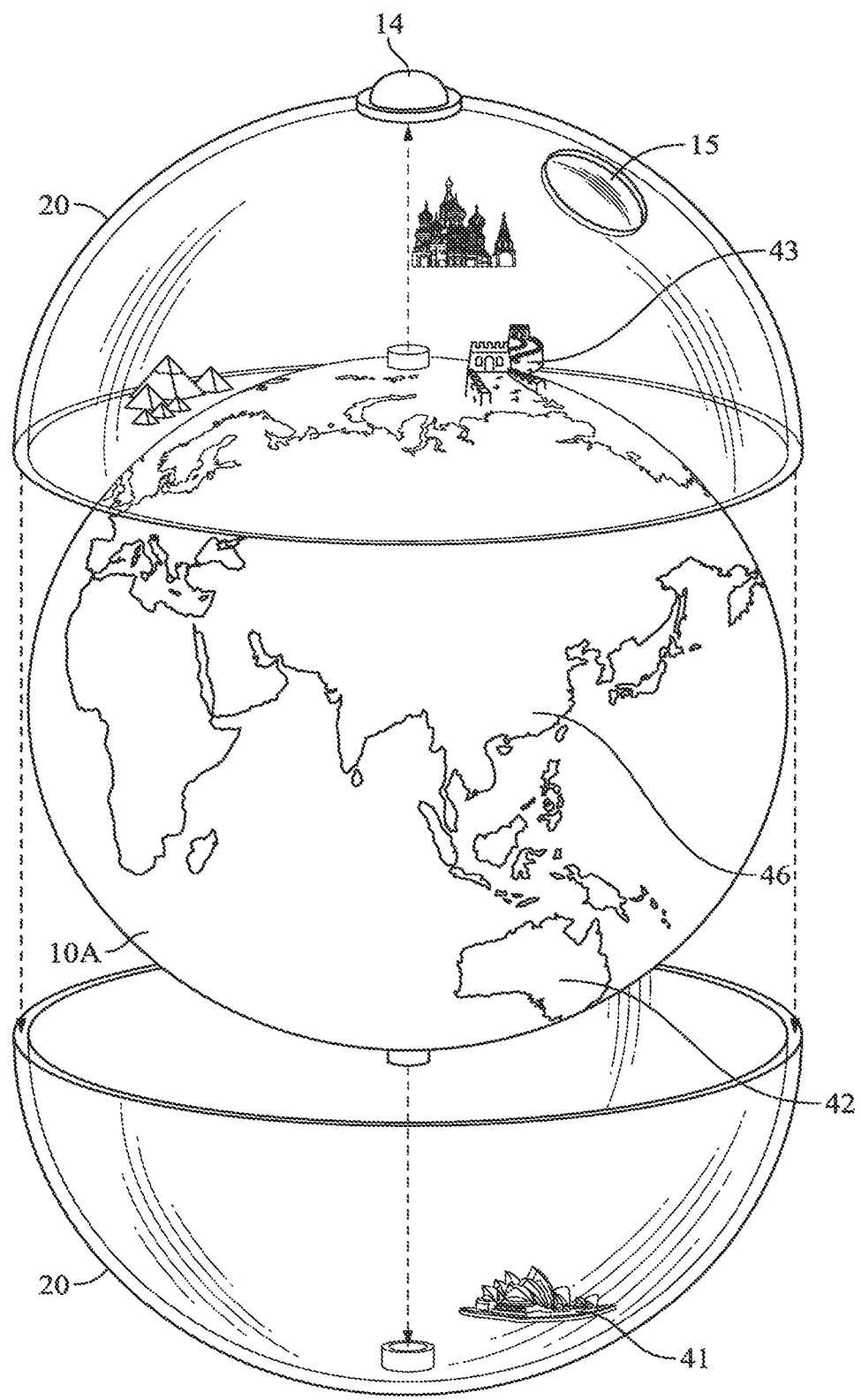
FIG. 22 is a blown apart view of FIG. 21.

In play, the embodiment of the invention shown in FIGS. 21 and 22 is designed for a geography matching game. Similar matching games could be constructed alternatively for a wide range of related figures, as discussed above with respect to FIGS. 1-5. In the geography matching game of FIGS. 21 and 22, cover 20 has depictions of famous landmarks and board or ball 10A is a world globe. In the game, players rotate cover 20 about ball 10A within cover 20 to position a particular landmark over the country where the landmark is found. For example, the Sydney Opera House 41 is positioned above Australia 42 and the Great Wall of China 43 is positioned above China 46 in FIG. 21.

Figure 24:
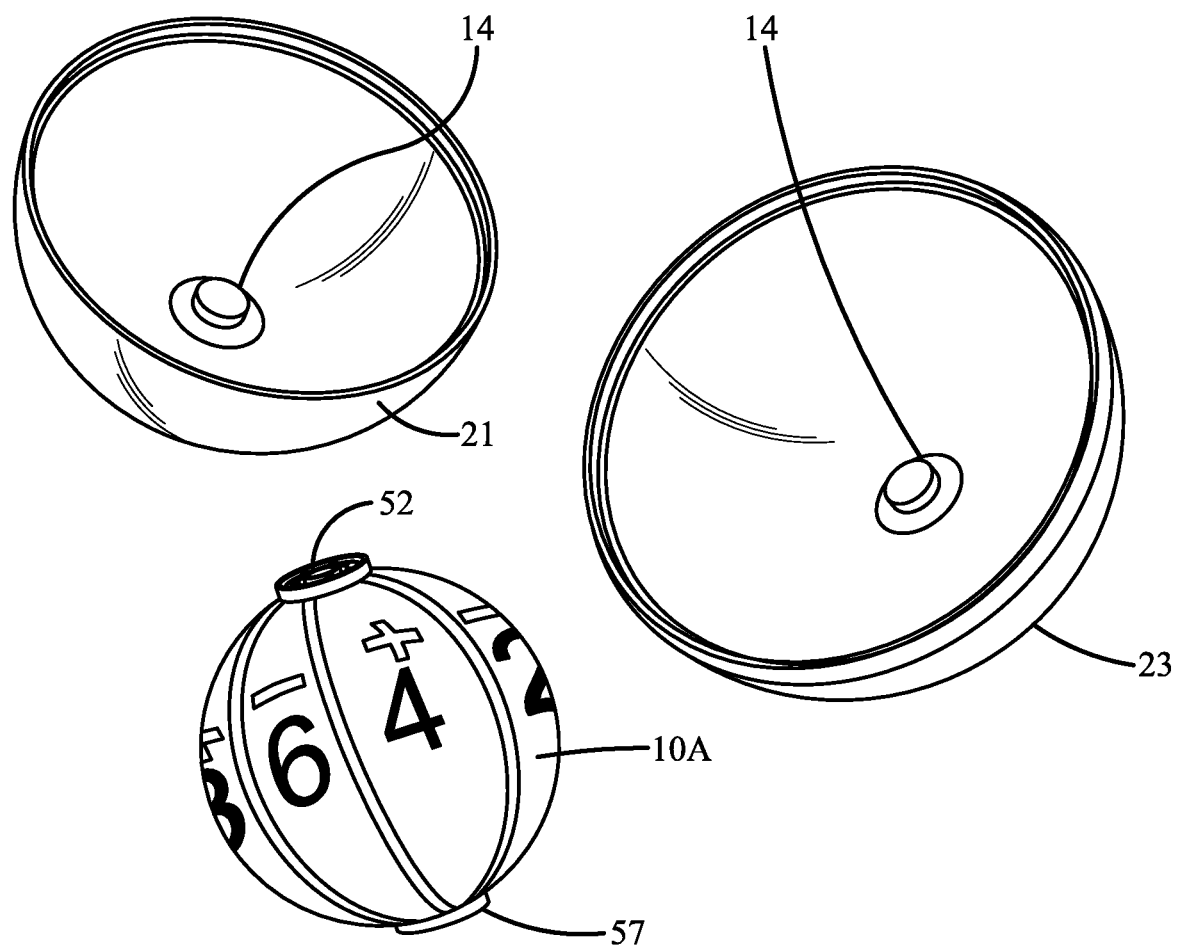
FIG. 24 is a blown apart view of a seventh embodiment of the invention in the form of a ball.

FIG. 23 shows a sixth embodiment of the ball toy. In this embodiment, the outer cover 20 includes the upper and lower shells 21, 23 that are press fit together as previously mentioned. Also, one or both of the shells may have ball bearings 52 or a ring bearing provided between an inner bearing 57 and an outer bearing 58. The ball bearings 52 enable the inner bearing 57 to rotate relative to the respective shell. The connector 14 such as a peg is securely received in the inner bearing 57 so that the inner bearing 57 and peg 14 rotate together relative to the shell. In this embodiment, the plus signs are removed from the cover 20. Alternatively, as shown in FIG. 24 of a seventh embodiment of the toy, the inner bearings 57, outer bearing 58 and ball bearings 52 may be located on opposite poles of the ball 10A, and the pegs 14 may be located on opposite poles of the outer cover 20. All other elements of the embodiments of FIGS. 23 and 24 are similar in structure and function to that of the fourth embodiment shown in FIGS. 19 and 20. The ball 10A in FIG. 23 shows the opposite side of the ball 10A in FIGS. 19 and 20 with the number "6" below a multiplication sign and the number "2" below a minus sign. FIGS. 19 and 20 show the other side of the ball with the number "1" below a minus sign and the number "4" below a plus sign. Thus, the ball has 4 different color spots with numbers inside the spots and arrows.

Figure 25:
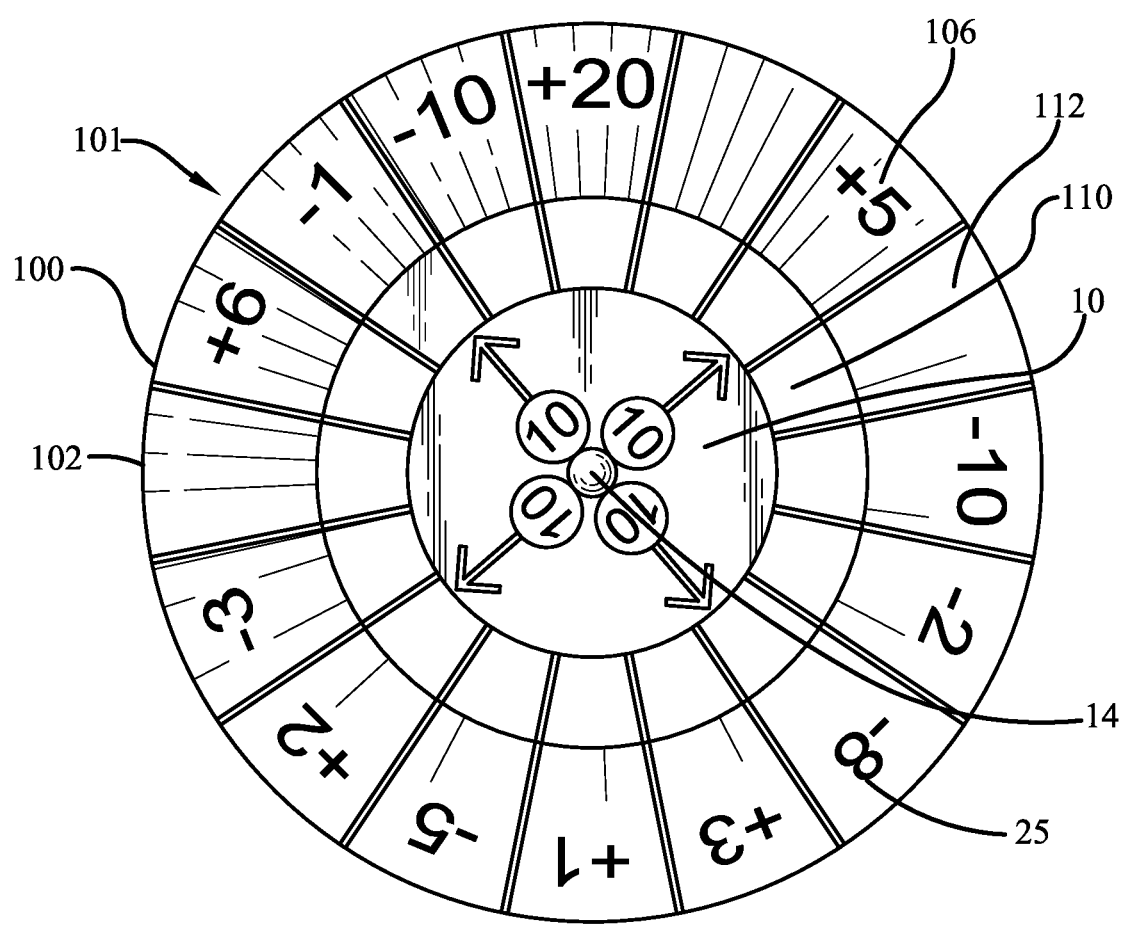
FIG. 25 is a top view of an eighth embodiment of the present invention showing depiction of numbers for use of the invention for mental math practice or a math game.
Figure 26:
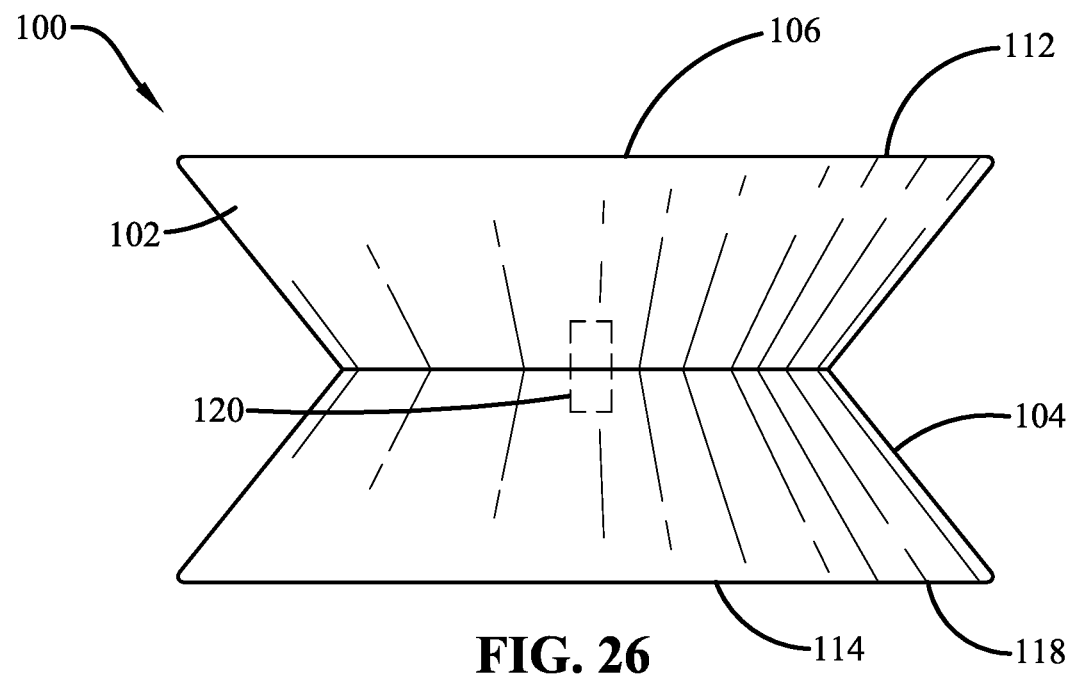
FIG. 26 is a side view of the toy of FIG. 25.
Figure 27:
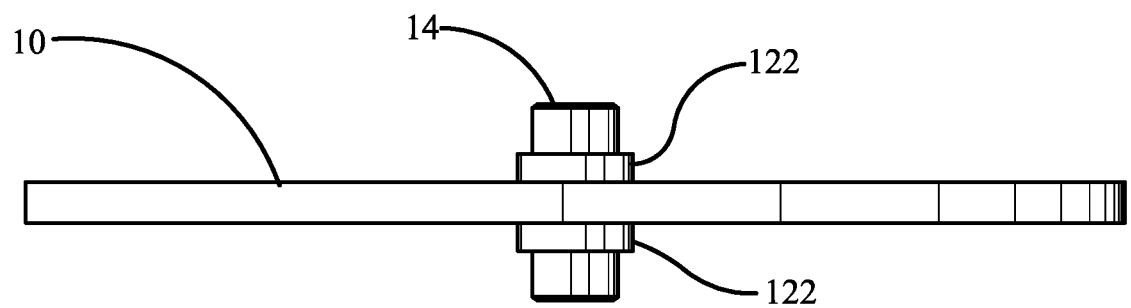
FIG. 27 is a side view of the wheel with connector of the embodiment of FIG. 25.
Figure 28:
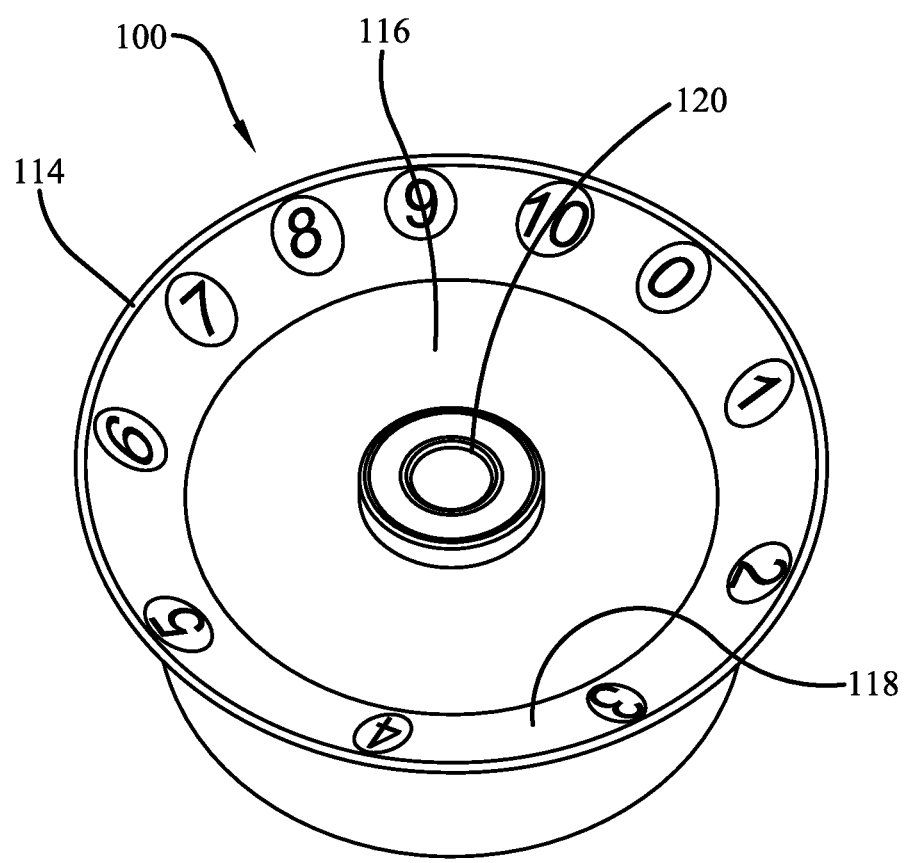
FIG. 28 is a bottom view of the embodiment of FIG. 25.

FIGS. 25 to 28 show an eighth embodiment of the toy 101 of the present invention. In this embodiment, the information layers or boards form an hourglass shaped base 100. In particular, the base 100 includes a frusto-conically shape upper portion 102 and a frusto-conically shaped lower portion 104 as illustrated in FIG. 26. The upper portion 102 includes a top end 106 and tapers going downwardly from the top end 106. The top end 106 has an inner central portion 110 that is surrounded by an outer portion 112 as depicted in FIG. 25. The outer portion 112 slopes upwardly or away from the upper portion 102 going outwardly from the inner central portion 110. The lower portion 104 includes a bottom end 114 and tapers going upwardly from the bottom end 114. The bottom end 114 has an inner central portion 116 that is surrounded by an outer portion 118 as seen in FIG. 28. The outer portion 118 slopes downwardly or away from the lower portion 104 going outwardly from the central portion 116. The upper and lower portions 102, 104 may be integrally formed together with each other in one piece or be two or more pieces attached together.

Indicia (FIG. 25) is printed on the surface of the top end 106 of the upper portion 102 and alternatively or additionally on the surface of the bottom end 114 of the lower portion 104 (FIG. 28). The indicia may comprise all numbers 25. The numbers 25 may be arranged for a mental math and competition game. In this eighth embodiment of the invention, shown in FIGS. 25-28, the numbers are printed on the outer portion 112 and arranged circumferentially around the outer portion 112. Alternatively, the numbers could be imprinted on the inner central portion 110 and arranged circumferentially around the inner center portion 110. Bearings 120 may be disposed in the centers of the top end 106 of the upper portion 102 and bottom end 114 of the lower portion 104.

As seen in FIGS. 25 and 27, the toy includes a disc shaped board or wheel that defines the first layer 10 as also shown in FIG. 7. The diameter of the wheel is less than the diameters of the inner central portion 110. The wheel 10 includes indicia printed on one or both axial sides. The indicia includes numbers and arrows that are used in the game. The wheel 10 may be mounted on a connector 14 that is itself rotatable or allow for rotation of the wheel 10 independently of the connector rotation. The connector 14 may be a snap rivet, brads, rollable magnets, nuts and bolts, pegs, ball bearings, or various combinations of these. In one example, the connector may be a peg 14 that extends through the center of the wheel 10 and through fasteners 122 fastened on opposite sides of the wheel 10 as illustrated in FIG. 27. The peg 14 is secured to the fasteners 122 so that the fasteners 122 prevent removal of the peg 14 from the wheel 10. The wheel 10 is rotatably mounted on base such that the peg 14 is rotatably received in the bearing 120. As can be seen in FIG. 27, opposite portions of the peg 14 extend beyond their respective sides of the wheel and each portion can be rotatably received in the bearing 120. This enables the wheel 10 to be rotatably mounted on either axial side of the wheel 10. Also, in view of the above, the wheel 10 can rotatably mounted to the top end 106, or the base 100 can be turned upside down and the wheel can be rotatably mount to the bottom end 114. Thus, in this embodiment as well as the other mentioned embodiments, the first layer can be reversible and have information on the other side too (e.g.

numbers, letters, signs, characters etc.), and the wheel can be rotatably mounted on either the top end 106 or the bottom end 114 of the base 100.

Figure 29:
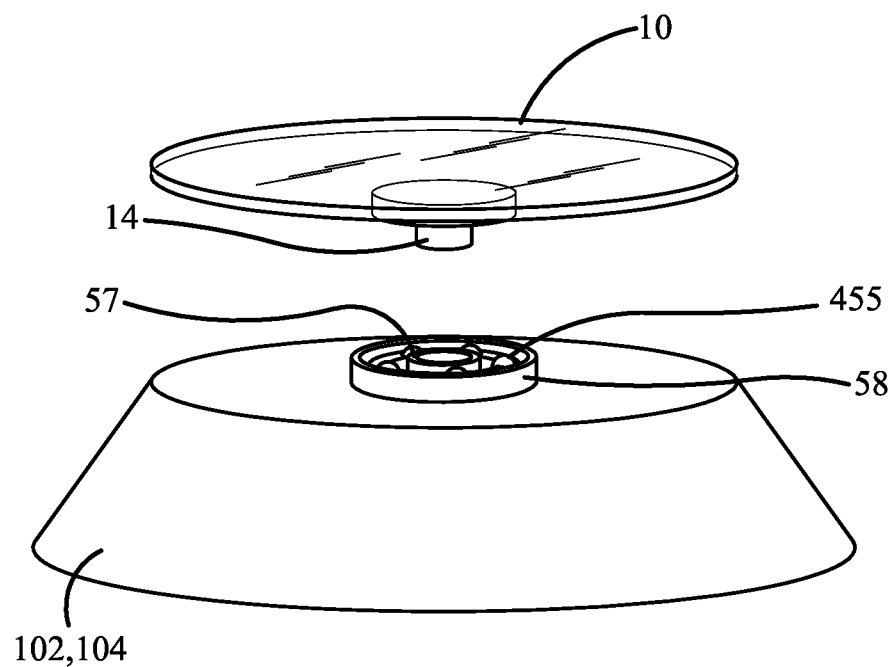
FIG. 29 is a partial exploded view of a ninth embodiment of the present invention.

The wheel 10 is rotatable about a central axis and allows for multiple functions of math to be done as a game, or for practicing mental math. Depending on the turn of the board or wheel, one might add or subtract a number as provided in this example in a similar manner as that of the first alternative embodiment. The game could be played with one, two, three or four persons, each taking his or her turn and determining who gets the highest (or lowest) total value added or subtracted as provided by the wheel, preferably over multiple rounds. In an alternative ninth embodiment as shown in FIG. 29, the base may be just the upper portion 102 or lower portion 104. Each of the upper portion and lower portion are a frusto-conical shape. However, in this embodiment, the upper portion 102 tapers going upwardly to the top end 106. Alternatively, the base may include both the upper portion and lower portion in which the lower portion 104 is similar to that in the eight embodiment or the lower portion 104 may taper downwardly to the bottom end 114. It should be noted that, if the toy in the figures is turned over, elements described as "upper" elements or features would then be "lower" elements or features.

Figure 30:
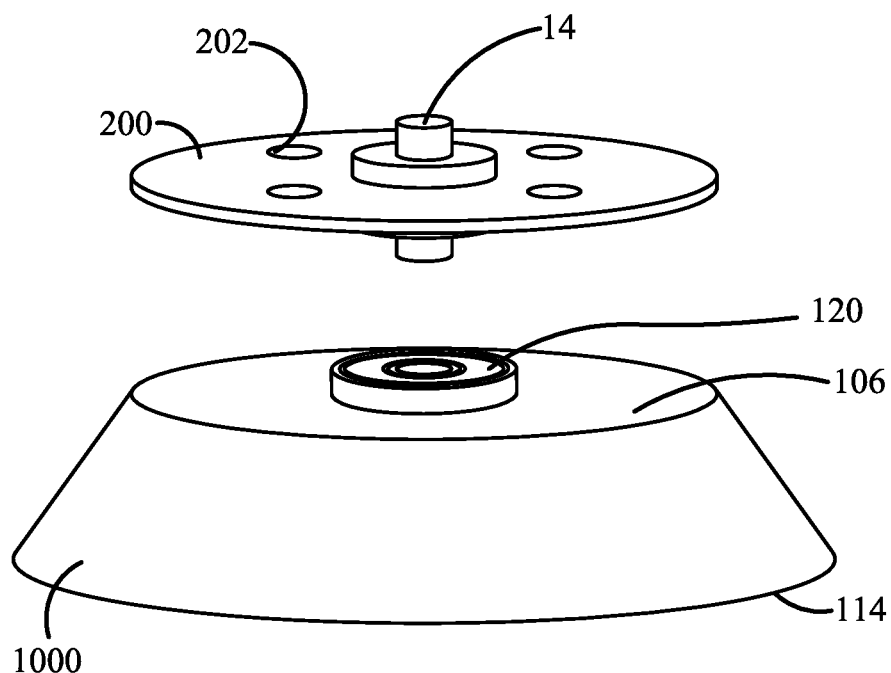
FIG. 30 is a partial exploded view of a tenth embodiment of the present invention.
Figure 31:
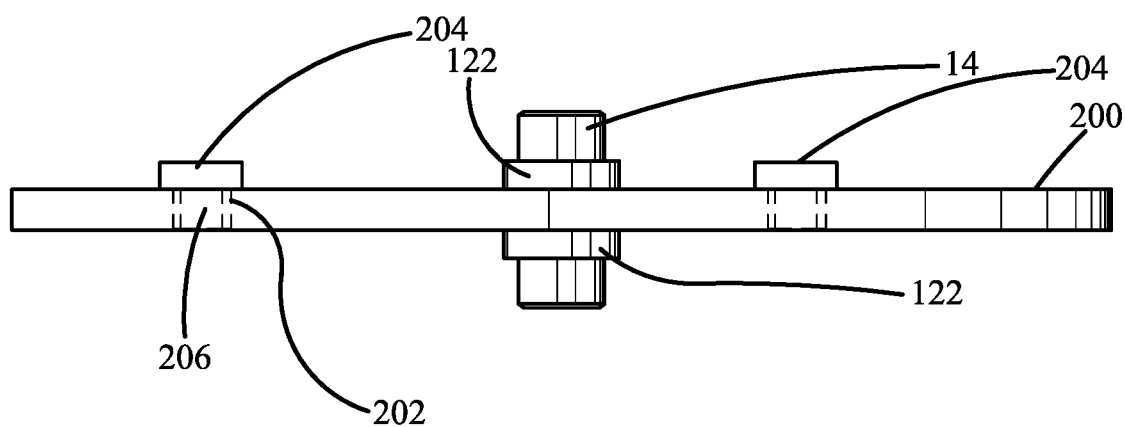
FIG. 31 is a side view of the wheel and related parts of the tenth embodiment of FIG. 6.
Figure 32:
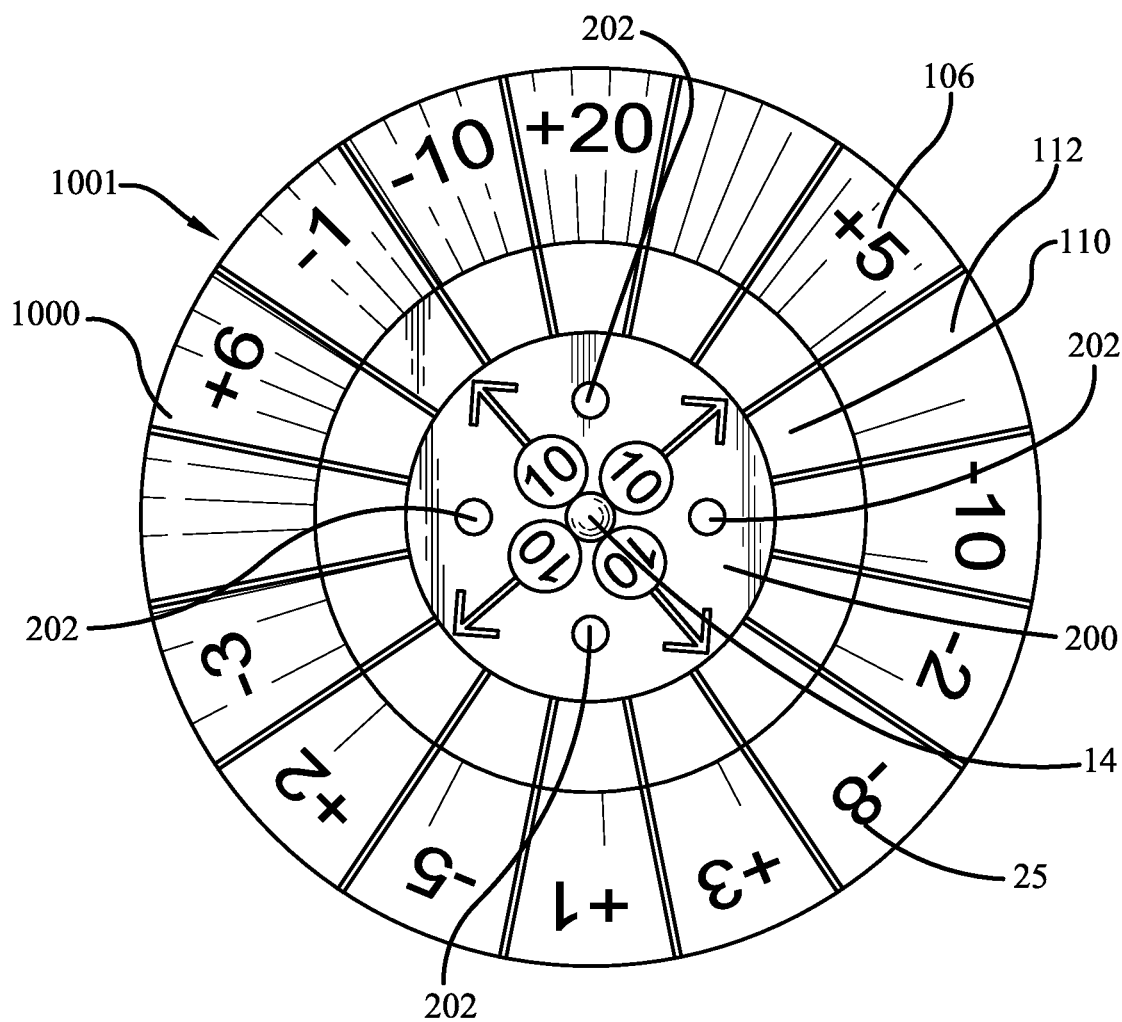
FIG. 32 is a top view of the tenth embodiment of FIG. 30.

FIGS. 30-32 show a tenth embodiment of a toy 1001 of the present invention. In this embodiment, the base 1000 is similar to the base of the embodiment of FIG. 29. In particular, the base may be just the upper portion 102 of the base 100 of the eighth embodiment as illustrated in FIG. 30, or the lower portion 104 of the base 100 of the eighth embodiment. The base 1000 has a frusto-conical shape and tapers going upwardly to the top end 106. Alternatively, the base may include both the upper portion and lower portion in which the lower portion 104 is similar to that in the eighth embodiment, or the lower portion 104 may taper downwardly to the bottom end 114. Referring to FIG. 32, indicia is printed on the surface of the top end 106 of the upper portion 102 and alternatively or additionally on the surface of the bottom end 114. The indicia may comprise all numbers 25. The numbers 25 may be arranged for a mental math and competition game. In this tenth embodiment of the invention, the numbers are printed on the outer portion 112 and arranged circumferentially around the outer portion 112. Alternatively, the numbers could be imprinted on the inner central portion 110 and arranged circumferentially around the inner center portion 110. As illustrated in FIG. 30, a bearing 120 may be disposed in the center of the top end 106.

The toy includes a disc shaped board or wheel that defines the first layer 200. The first layer 200 is similar to the first layer 10 of FIG. 7 except for the following. Similar to the wheel 10 of FIG. 27, the diameter of the wheel is less than the diameter of the inner central portion 110 (FIG. 32). The wheel 200 includes indicia (FIG. 32) printed on one or both axial sides. The indicia includes numbers and arrows that are used in the game. The wheel 200 further includes apertures 202 for receiving a shaft 206 or other connector of a charm 204 or other object. The charm 204 may be removably attached to the wheel via the shaft 206 in suitable ways. In one example, the shaft 206 and aperture 202 may be threaded so that the shaft 206 is threadily attached to the wheel 200 via the aperture 202. In another example, the shaft 206 may taper towards its free end to enable a frictional attachment of the shaft 206 to the wheel 200 via the aperture 202. The wheel 200 may be mounted on a connector 14 that is itself rotatable or allow for rotation of the wheel 200 independently of the connector rotation. The connector 14 may be a snap rivet, brads, rollable magnets, nuts and bolts, pegs, ball bearings, or various combinations of these. In one example, the connector may be a peg 14 that is fixed to the wheel 200 for rotation with the wheel 200 and also extends through the center of the wheel 200 and through fasteners 122 fastened on opposite sides of the wheel 10 as illustrated in FIG. 31. The peg 14 is secured to the fasteners 122 so that the fasteners 122 prevent removal of the peg 14 from the wheel 200. The wheel 200 is rotatably mounted on the base such that the peg 14 is rotatably received in the bearing 120. As can be seen in FIG. 31, opposite portions of the peg 14 extend beyond their respective sides of the wheel 200 and each portion can be rotatably received in the bearing 120. This enables the wheel 200 to be rotatably mounted on either axial side of the wheel 200. Also, in view of the above, the wheel 200 can be rotatably mounted to the top end 106, or the base 100 can be turned upside down and the wheel can be rotatably mount to the bottom end 114. Thus, in this embodiment as well as the other mentioned embodiments, the first layer can be reversible and have information on the other side too (e.g. numbers, letters, signs, characters etc.), and the wheel can be rotatably mounted on either the top end 106 or the bottom end 114 of the base 100.

Figure 46:
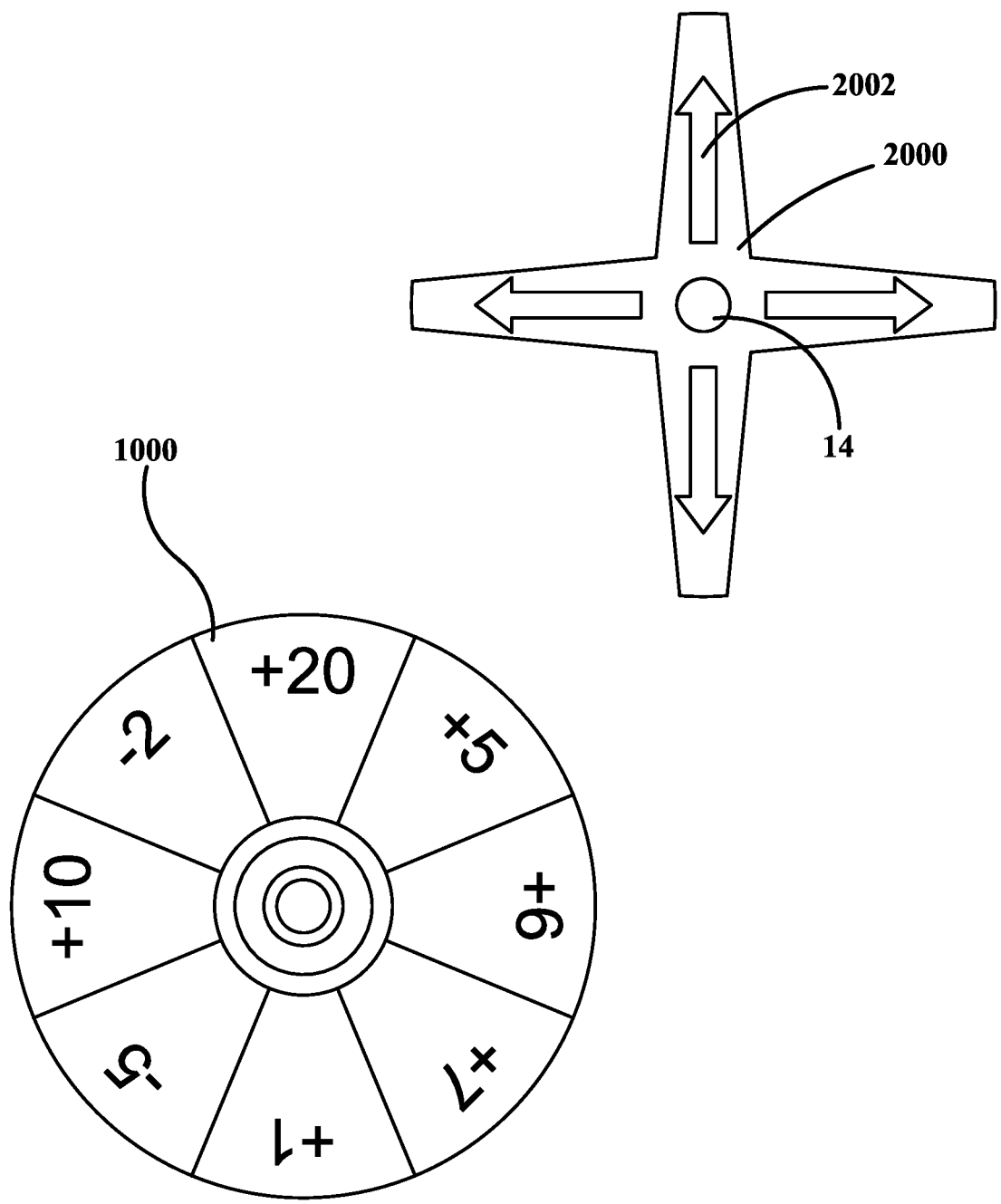
FIG. 46 is a top exploded view of the base of the tenth embodiment with an alternative version of the first layer.
Figure 47:
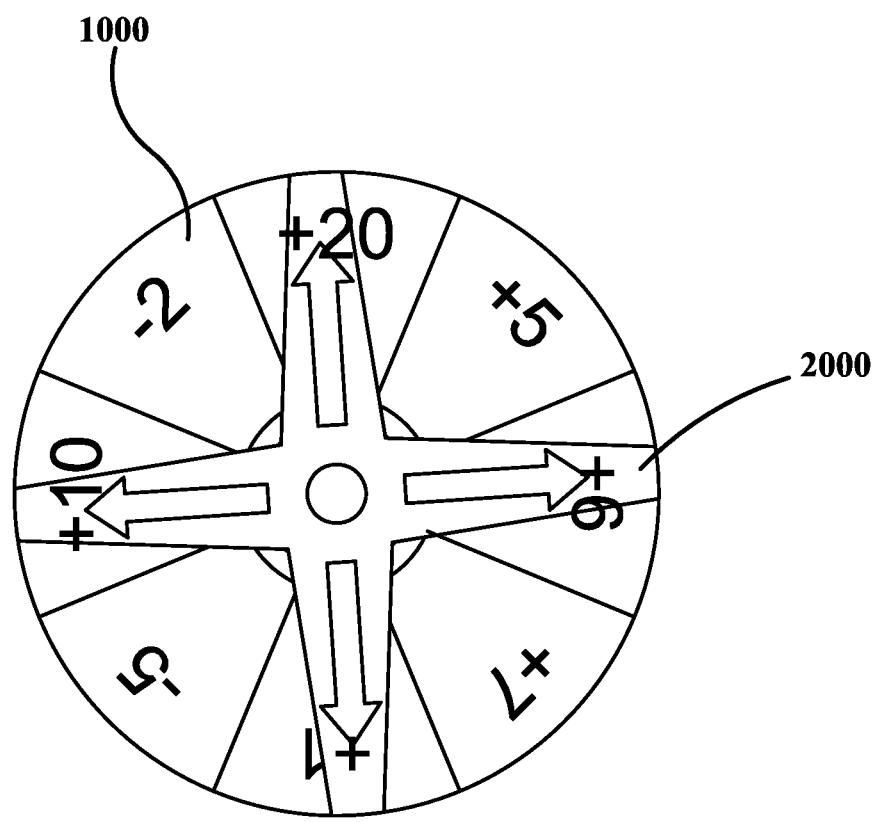
FIG. 47 is a top view of the toy of FIG. 46 with the first layer installed on the base.

Depending on the turn of the board or wheel, one might add or subtract a number as provided in this example in a similar manner as that of the first alternative embodiment. The game could be played with one, two, three or four persons, each taking his or her turn and determining who gets the highest (or lowest) total value added or subtracted as provided by the wheel, preferably over multiple rounds. In one example, one side of the wheel may have addition answers and the opposite side of the wheel may have subtraction answers. In another example, one side of the wheel may have multiplication answers and the opposite side of the wheel may have division answers. FIGS. 46 and 47 show the base 1000 with an alternative version of the first layer. In this version, the first layer 2000 has a cross shaped or four point star shape spinner instead of a wheel or disc shaped structure. The spinner may have a clear plastic or other suitable material cover 2002. The spinner 2000 also has the peg 14 located in the center and fixed thereto. Opposite portions of the peg 14 extend beyond their respective sides of the spinner 2000 and each portion can be rotatably received in the bearing 120. This enables the wheel 200 to be rotatably mounted on either axial side of the wheel 200. All other elements of this version are similar in structure and function to that of the tenth embodiment. In addition, this first layer 2000 may also be rotatably mounted on the second board 60 of FIGS. 6-17, the board 65 of FIG. 18, the base 100 of FIGS. 25-28 of the eighth embodiment, and the base of FIG. 29 of the ninth embodiment.

Figure 33:
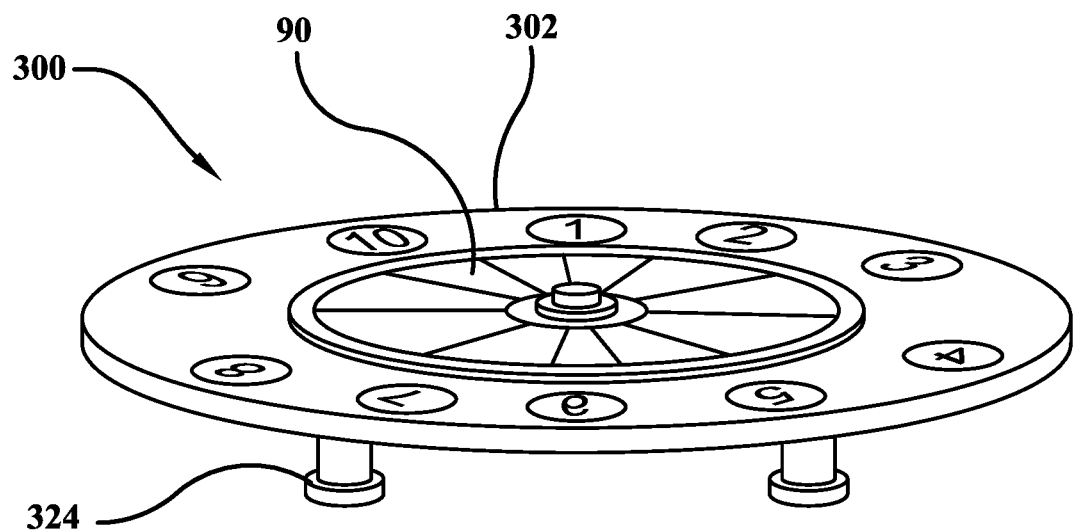
FIG. 33 is a top and side perspective view of an eleventh embodiment of the present invention.
Figure 34:
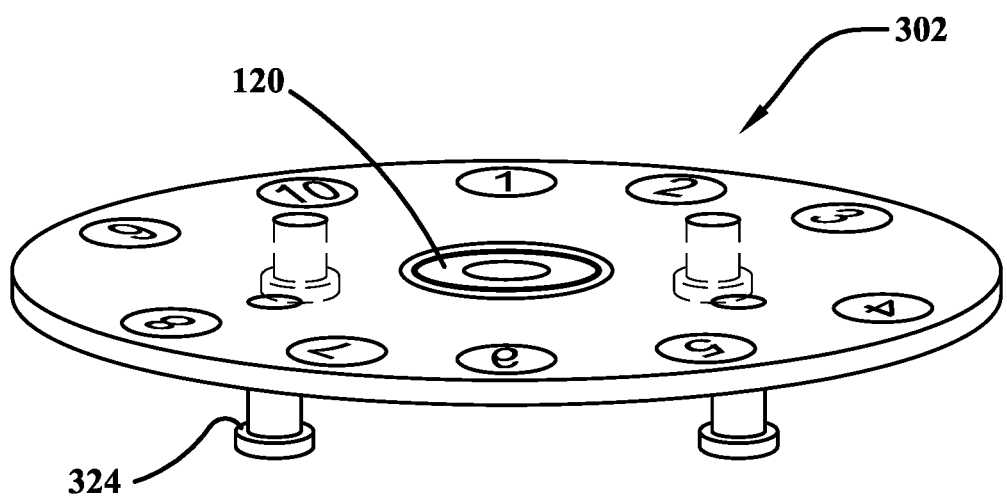
FIG. 34 is a top and side perspective view of the base of the eleventh embodiment of FIG. 33.
Figure 35:
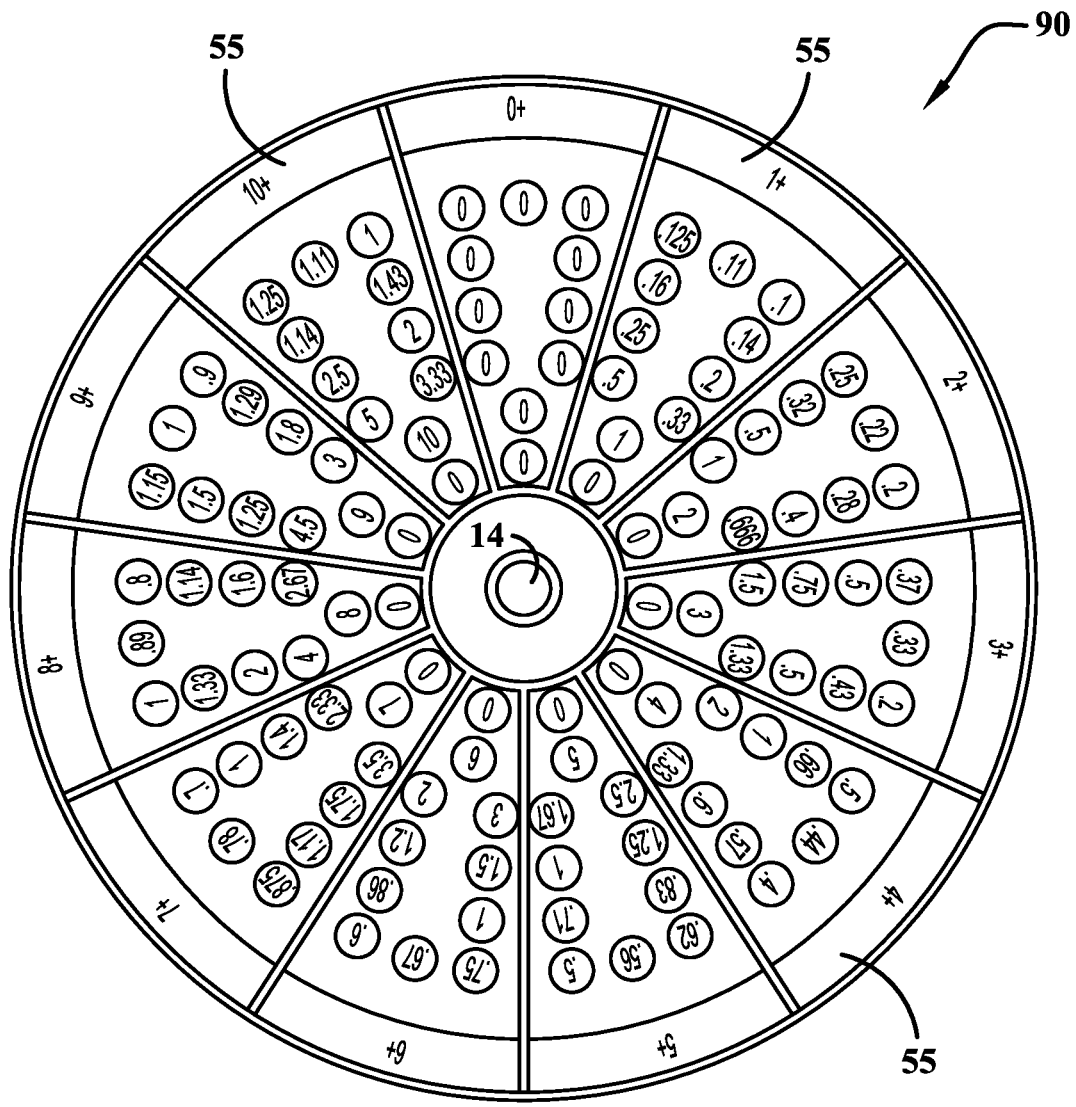
FIG. 35 is a top view of the eleventh embodiment of FIG. 33.

FIGS. 33-35 show an eleventh embodiment of the present invention. In this embodiment, the toy 300 comprises a disc or top board 90, which is similar to that of FIG. 17 and an underlying second board 302, which is similar to FIG. 18. As illustrated in FIG. 35, board 90, the top board, will have the answers. Thus, for example, to divide the number nine by the number nine, the user would rotate top board 90 to line up the section "9/" in the outer perimeter 55 of board 90 with the number "9" in green color on the underlying or second board 302. One would then look for the answer on the top board 90 based on the color of the number "9" on the second board 302. Since that color is green, the answer would be one as one is the number in section "9/" on board 90 that is in that same color, green. Bearings 120 may be disposed on a bottom wall of a pocket 815 (FIG. 48) at the center of the top end 306 of the second board 302 for rotatably receiving the connector 14. The connector may be a peg 14 in which opposite portions of the peg 14 extend beyond their respective sides of the board 90 and each portion can be rotatably received in the bearing 120. This enables the board 90 to be rotatably mounted on either axial side of the board 90. Thus, in this embodiment as well as the other mentioned embodiments, the board 90 can be reversible and have information on the other side too (e.g. numbers, letters, signs, characters etc.). In one example, one side of the board may be similar to the board 90 and the opposite side may be similar to board 70 for subtraction. In another example, one side of the board may be similar to board 80 shown in FIG. 16 for multiplication and the opposite side of the board may be similar to board 50 for addition. Alternatively, instead of board 90, the board may be similar to board 50, board 70, or board 80. The second wheel may have four support pegs 324 that are attached to the bottom end 314 of the second board 302 and depend downwardly therefrom to support the second board 302 and top board 90 on a surface.

Figure 48:
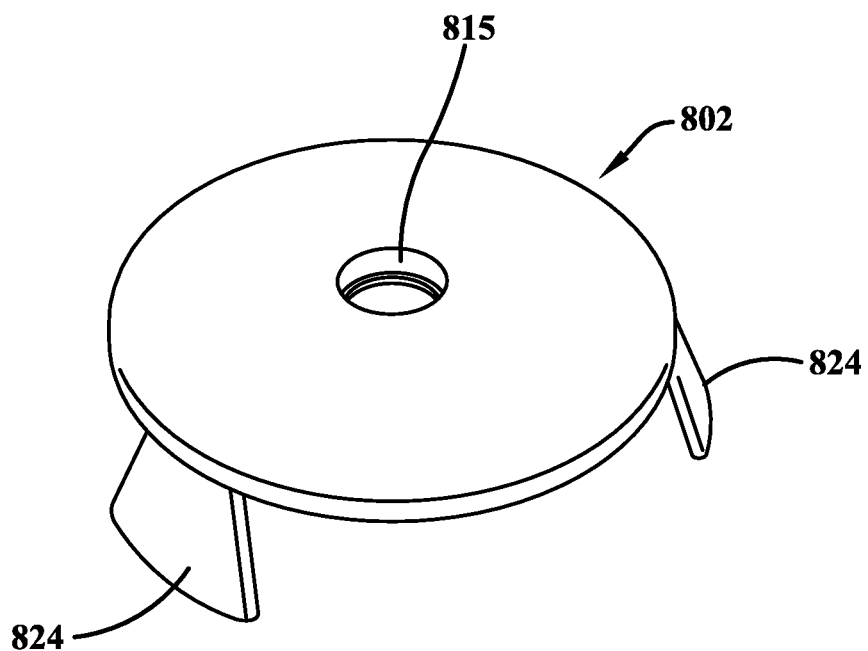
FIG. 48 shows a top and side perspective view of an alternative version of a base of the eleventh embodiment of FIG. 33.
Figure 49:
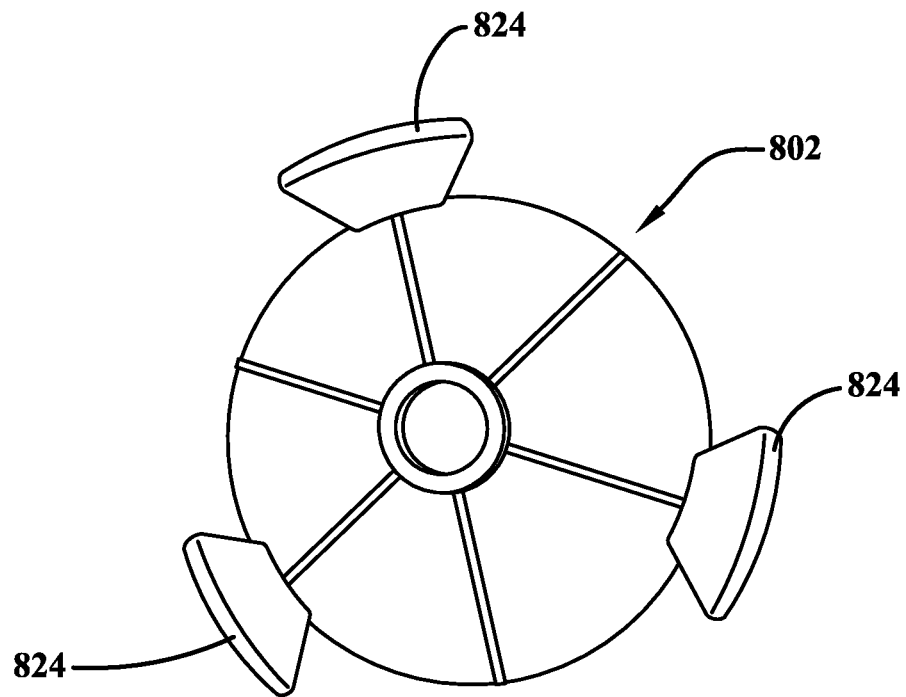
FIG. 49 shows a bottom perspective view of the base of FIG. 48.
Figure 50:
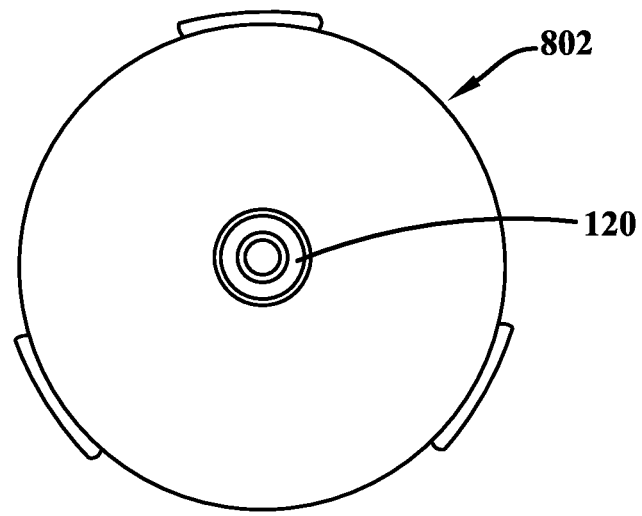
FIG. 50 shows a top perspective view of the base of FIG. 48 with the pocket of the base receiving a bearing.

FIGS. 48-50 show an alternative version of the second board 802 of the eleventh embodiment. This second board includes the pocket 815 (FIG. 48) that receives the bearing 120 disposed on its bottom wall as seen in FIG. 50. The bearing 120 rotatably receives the connector 14. The connector may be a peg 14 fixed to the board 90 for rotation with the board 90. Opposite portions of the peg 14 extend beyond their respective sides of the board 90 and each portion can be rotatably received in the bearing 120. Three equally spaced legs 824 are integrally molded via injection molding with the board 802 at the peripheral edge of the board as seen in FIG. 49. Each leg 824 depends downwardly and outwardly relative to the board 802. Each leg also flares in the downward direction so as to provide additional support. All other elements of this version are similar in structure and function to that of the eleventh embodiment.

Figure 37:
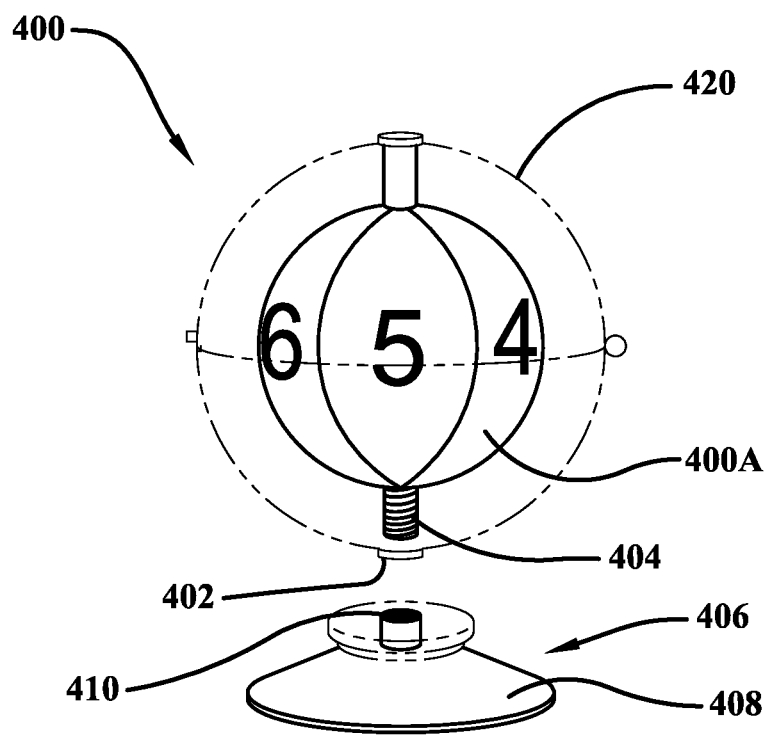
FIG. 37 is a partially exploded side view of a twelfth embodiment of the present invention.
Figure 38:
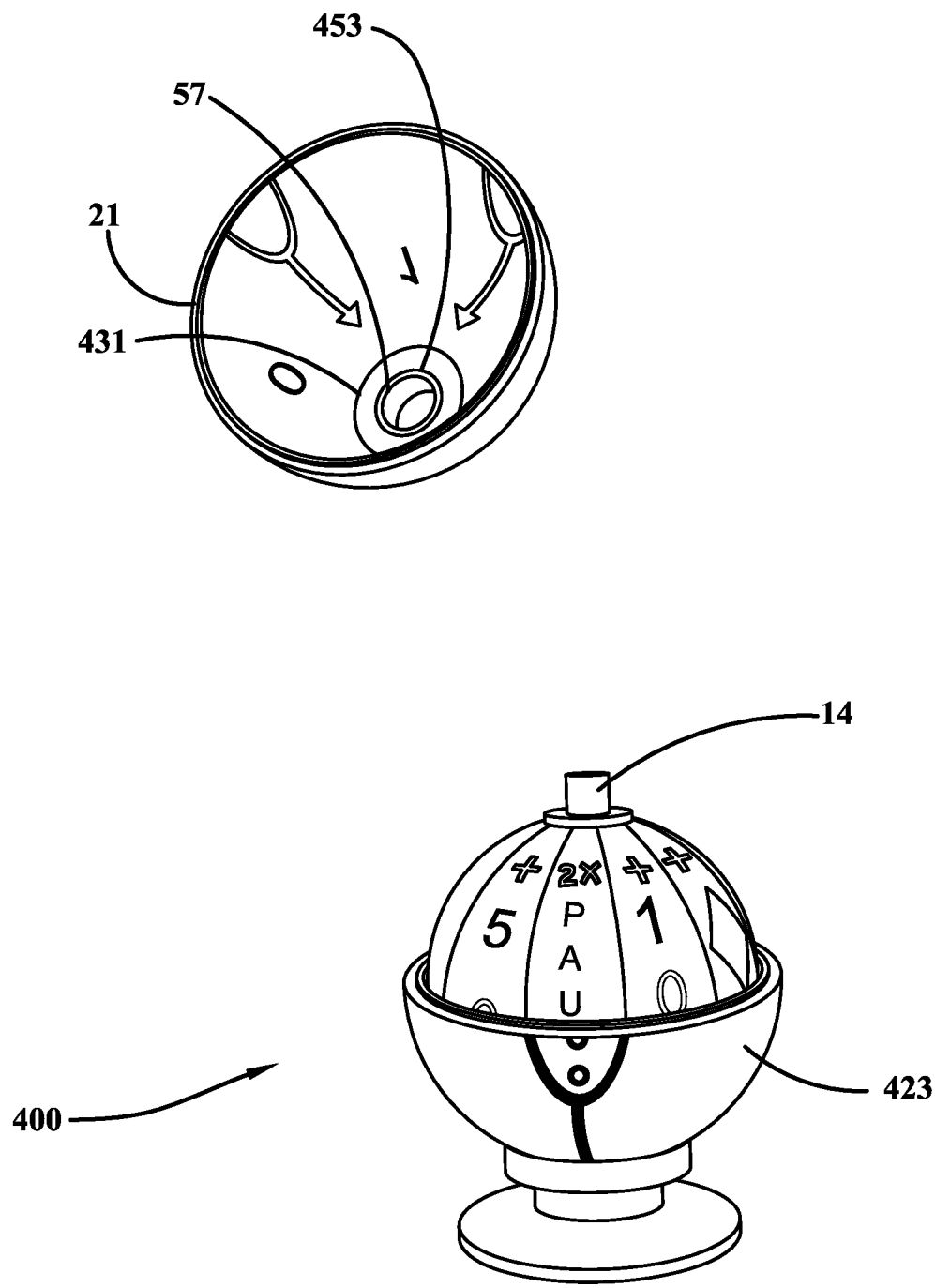
FIG. 38 is another partially exploded side view of the twelfth embodiment of the present invention.
Figure 39:
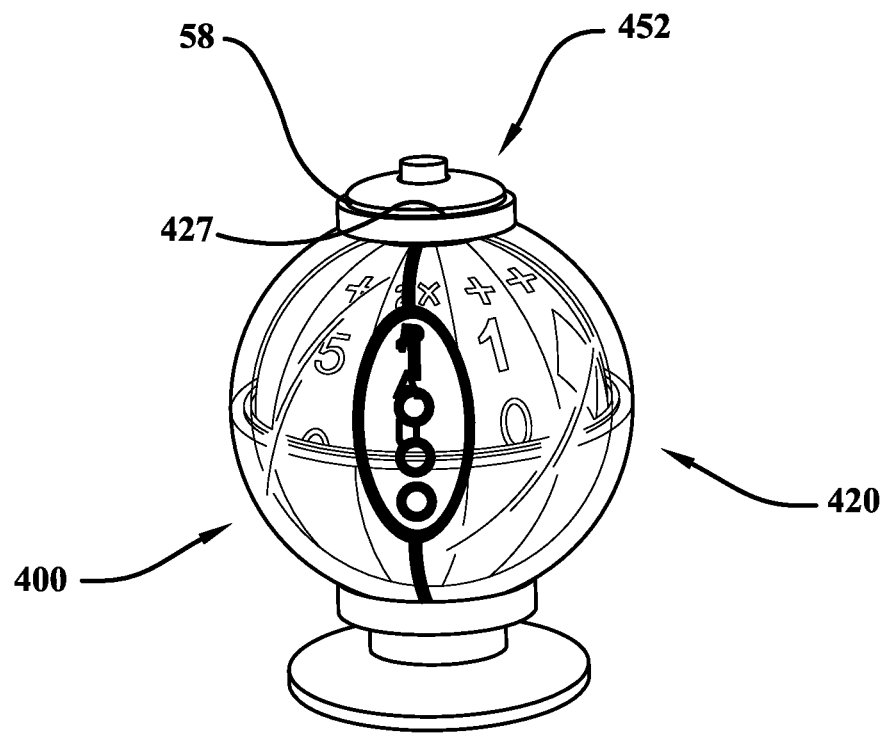
FIG. 39 is a perspective view of the twelfth embodiment of the present invention

FIGS. 37-39 show a twelfth embodiment of the present invention showing where the toy 400 is in the form a ball or spherical shape. The toy includes a ball 400A and an outer cover 420 (shown in phantom lines) that covers or partially covers the ball 400A. The outer cover may be similar to that of the sixth embodiment shown in FIG. 23 except that the bottom of the cover has the opening 402. Specifically, as seen in FIGS. 38, the outer cover 420 includes the upper shell 21 and a lower shell 423 that are press fit or threaded together as previously mentioned. Also, one or both of the shells may have a rubber or plastic cover. As illustrated in FIGS. 38 and 39, one or both of the shells 21, 423 include an exterior pocket 427 that receives a bearing 452. For example, FIGS. 38 and 39 show the upper shell 21 having the exterior pocket 427 with the bearing 452 inserted from outside of the outer cover 420 and disposed on an annular bottom step 431 of the pocket 427. The bearing 452 is similar in structure and function to that of bearing 120. Each of the bearings 120, 452 include ball bearings 455 (FIG. 29) that are provided between inner bearing ring 57 and outer bearing ring 58 (FIG. 39). A plastic ring cover 453 covers the underside of the ball bearings and rests upon the bottom step 431 of the pocket 427. The bottom step 431 supports the plastic ring cover 453 and the bearing 452 to keep the bearing 452 from falling into the upper shell 21. The ball bearings enable the inner bearing ring 57 to rotate relative to the outer bearing ring 58 and respective shell that the outer bearing ring 58 is fixed to. The connector 14 such as a peg is securely received in the inner bearing ring 57 so that the shell rotates relative to the inner bearing ring 57 and peg 14. The ball 400A and peg 14 rotate together relative to the outer cover 420.

Alternatively, the outer cover 420 may be similar to that of the fourth embodiment shown in FIGS. 19 and 20 except that the bottom of the cover has an opening 402. The ball 400A is similar to the ball 10A except for the following. In this embodiment a threaded shaft 404 is attached to the bottom of the ball 400A and extends through the opening 402 of the outer cover 420 as illustrated in FIG. 37. A stand 406 is provided that has a disc shaped base 408 and a threaded sleeve 410 attached to the base that extends upwardly from the center of the base 408. The shaft 404 threadily engages the sleeve 410, so that the stand 406 supports the ball 400A and outer cover 420. All other elements of this twelfth embodiment are similar in structure and function to that of the fourth embodiment shown in FIGS. 19 and 20 or alternatively the sixth embodiment shown in FIG. 23.

Figure 51:
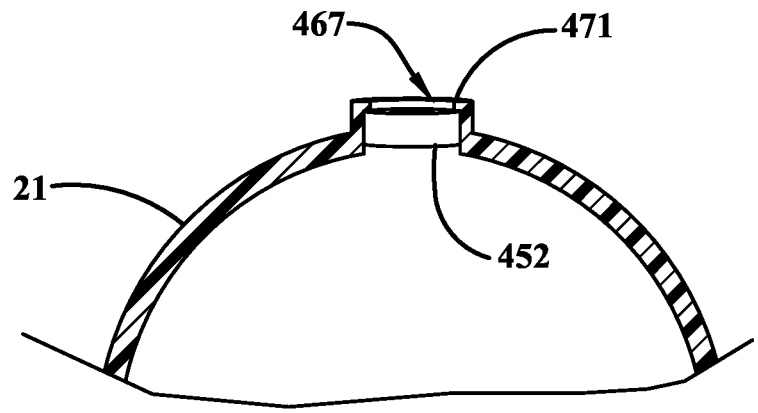
FIG. 51 shows an alternative version of the pocket of the twelfth embodiment of the present invention.
Figure 52:
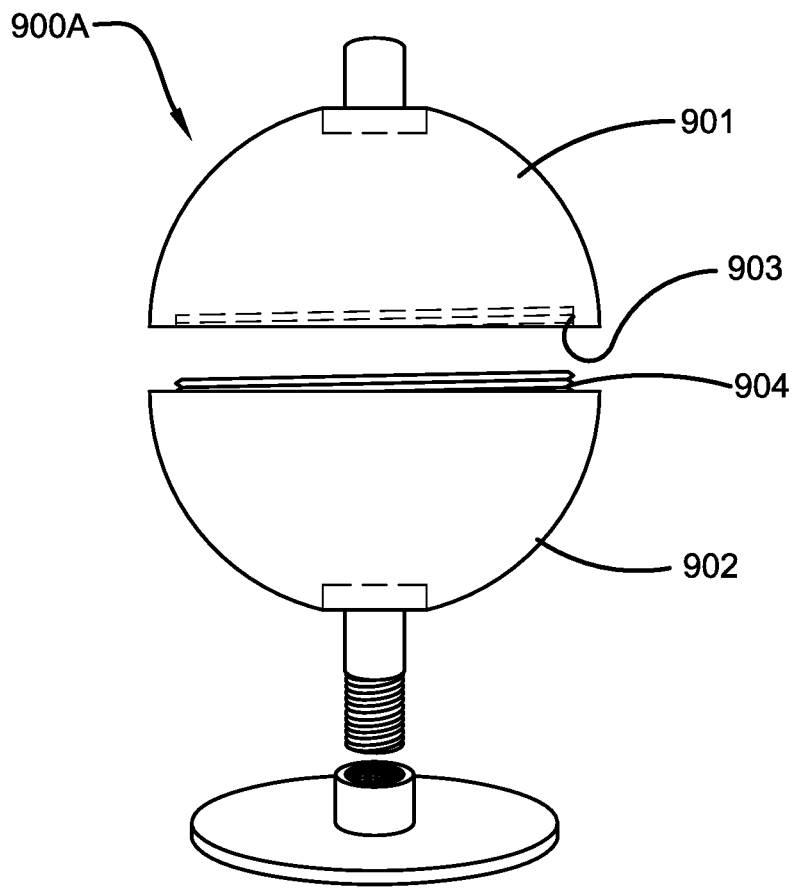
FIG. 52 is a partially exploded side view of the twelfth embodiment of the present invention but with an alternative version of the ball.

FIG. 51 shows an alternative version of the pocket 467 for one or both of the shells of the twelfth embodiment. In this version the pocket includes an interior pocket 467 in which the bearing 452 is inserted from the inside of the outer cover 420 into the interior pocket 467. For example, FIG. 51 shows the upper shell 21 having an interior pocket 467 with an annular top ledge 471 that engages the plastic ring cover 453 to support the bearing 452 and keep the bearing 452 from falling out of the upper shell 21. FIG. 52 shows an alternative version of a ball 900A for the twelfth embodiment. In this version, the ball 900A includes an upper semispherical portion 901 and a lower semispherical portion 902 that have threaded ends 903, 904 that threadily engage each other to removably connect the upper and lower portions 901, 902 together by twisting them. All other elements of this version of the ball 900A are similar to the ball 400A.

Figure 40:
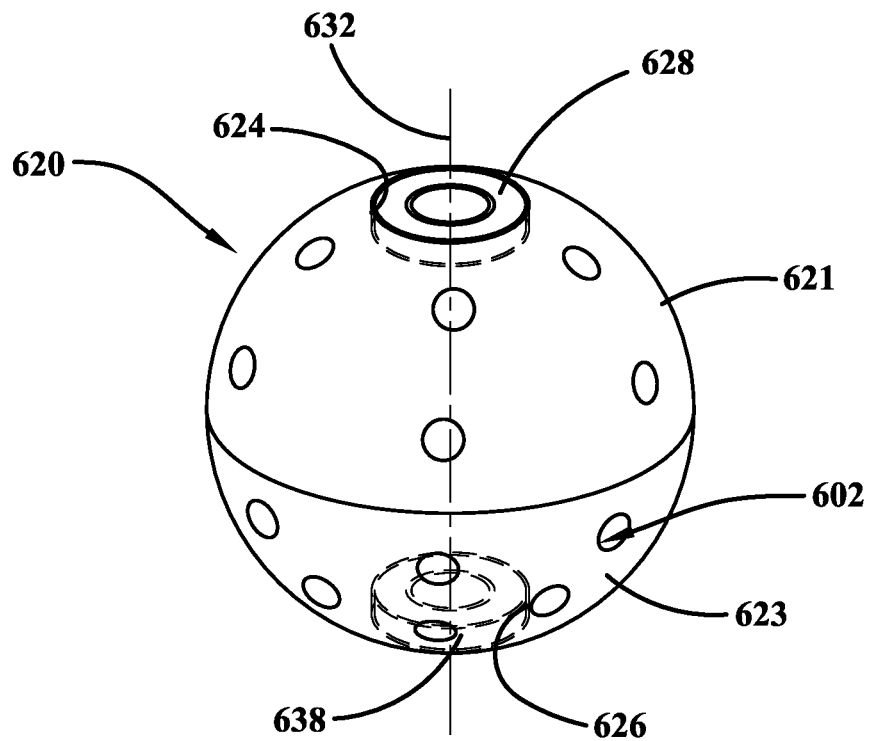
FIG. 40 is a side perspective view of a second alternative version of the ball of the embodiments of the ball type toys of the present invention.
Figure 41:
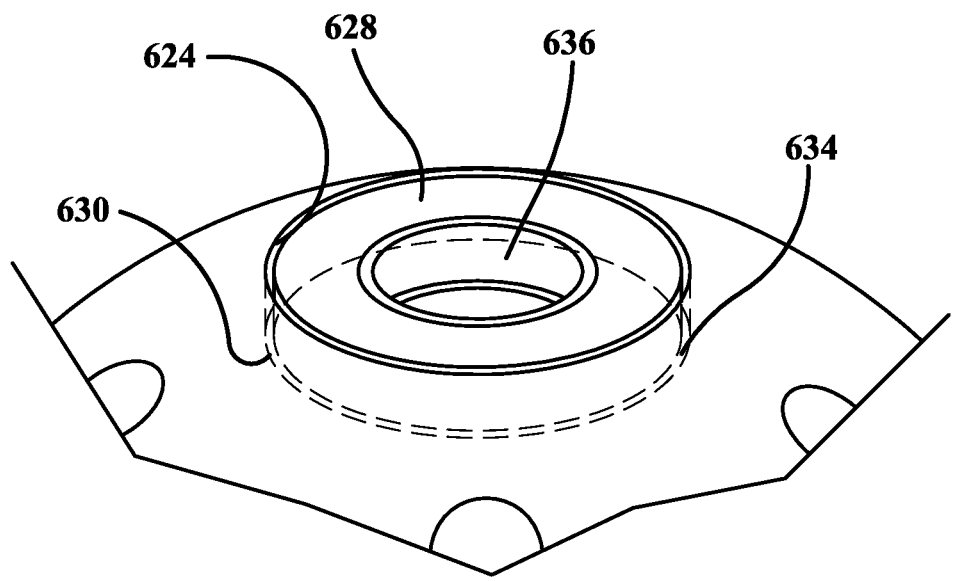
FIG. 41 is a side perspective view of a portion of the ball of FIG. 38 showing the upper recess and the upper bearing.
Figure 42:
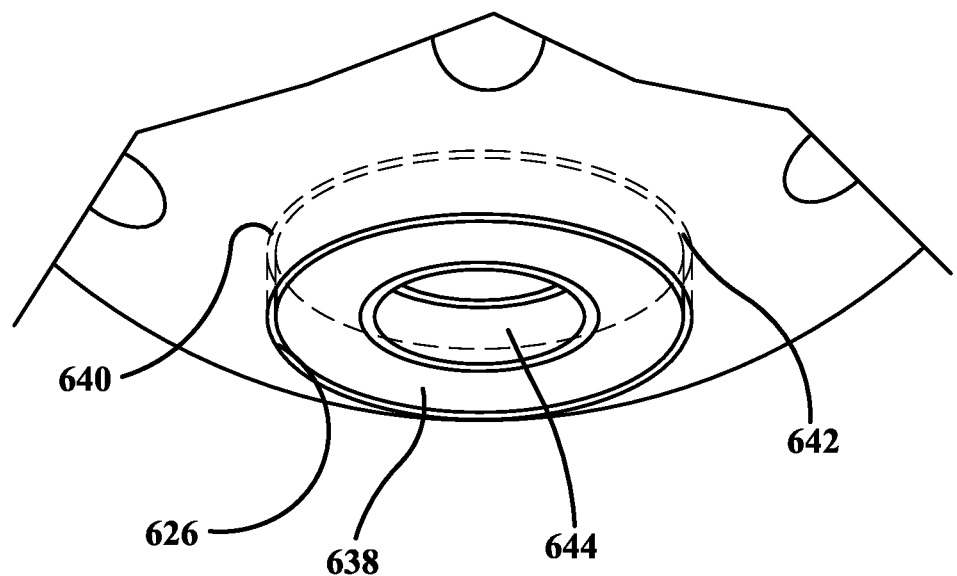
FIG. 42 is a side perspective view of a portion of the ball of FIG. 38 showing the lower recess and the lower bearing.

FIGS. 40-42 show an alternative version of an outer cover 620 that can cover the balls 10A of the fourth and sixth embodiment, and the ball 400A of the twelfth embodiment. In this version, the outer cover 620 comprise upper and lower shells 621, 623 that are removably attached to each other by a suitable way. For example, the upper and lower shells 621, 623 may be press fit together as previously mentioned. In another example, the upper and lower shells 621, 623 may include threaded ends that threadily engage together to removably attach the upper and lower shells 621, 623. In another example, the upper and lower shells 621, 623 may be pivotally connected together by a hinge and knob arrangement as described in the version of the outer cover shown in FIG. 36.

The outer cover 620 has an upper recess 624 formed in the top pole of the upper shell 621 and a lower recess 626 formed in the bottom pole of the lower shell 623. An upper ring shaped bearing 628 is received in the upper recess 624 and is supported by the portion of the outer cover defining the upper recess 624. Specifically, as illustrated in FIG. 41, a side wall 630 of the outer cover 620 defining the upper recess 624 that is parallel with the rotating axis 632 (FIG. 40) of the ball acts as a lateral stop to prevent lateral movement of the upper bearing 628 relative to the rotating axis 632. A bottom wall 634 of the outer cover defining the bottom of the upper recess acts as a stop to prevent the upper bearing from moving down towards the ball. The bottom wall includes an aperture 636 through which extends a connector 14 such as a peg or axle attached to the top of the ball. The connector 14 also extends through the upper bearing 628.

A lower ring shaped bearing 638 is received in the lower recess 626 and is supported by the portion of the outer cover 620 defining the lower recess 626. Specifically, as illustrated in FIG. 42, a side wall 640 of the outer cover 620 defining the lower recess 626 that is parallel with the rotating axis 632 of the ball acts as a lateral stop to prevent lateral movement of the lower bearing 638 relative to the rotating axis 632. A top wall 642 of the outer cover 620 defining the top of the lower recess 626 (as viewed in FIG. 41) acts as a stop to prevent the lower bearing 638 from moving further up towards the ball. The top wall 642 includes an aperture 644 through which extends a connector 14 such as a peg or bolt attached to the bottom of the ball. The upper and lower recesses 624, 626 and the upper and lower bearings 628, 638 support the connector 14 to enable stable rotation of the ball about the rotating axis 632. The bearings 628,638 are similar in construction and function as that of bearings 120 and 452.

Figure 44:
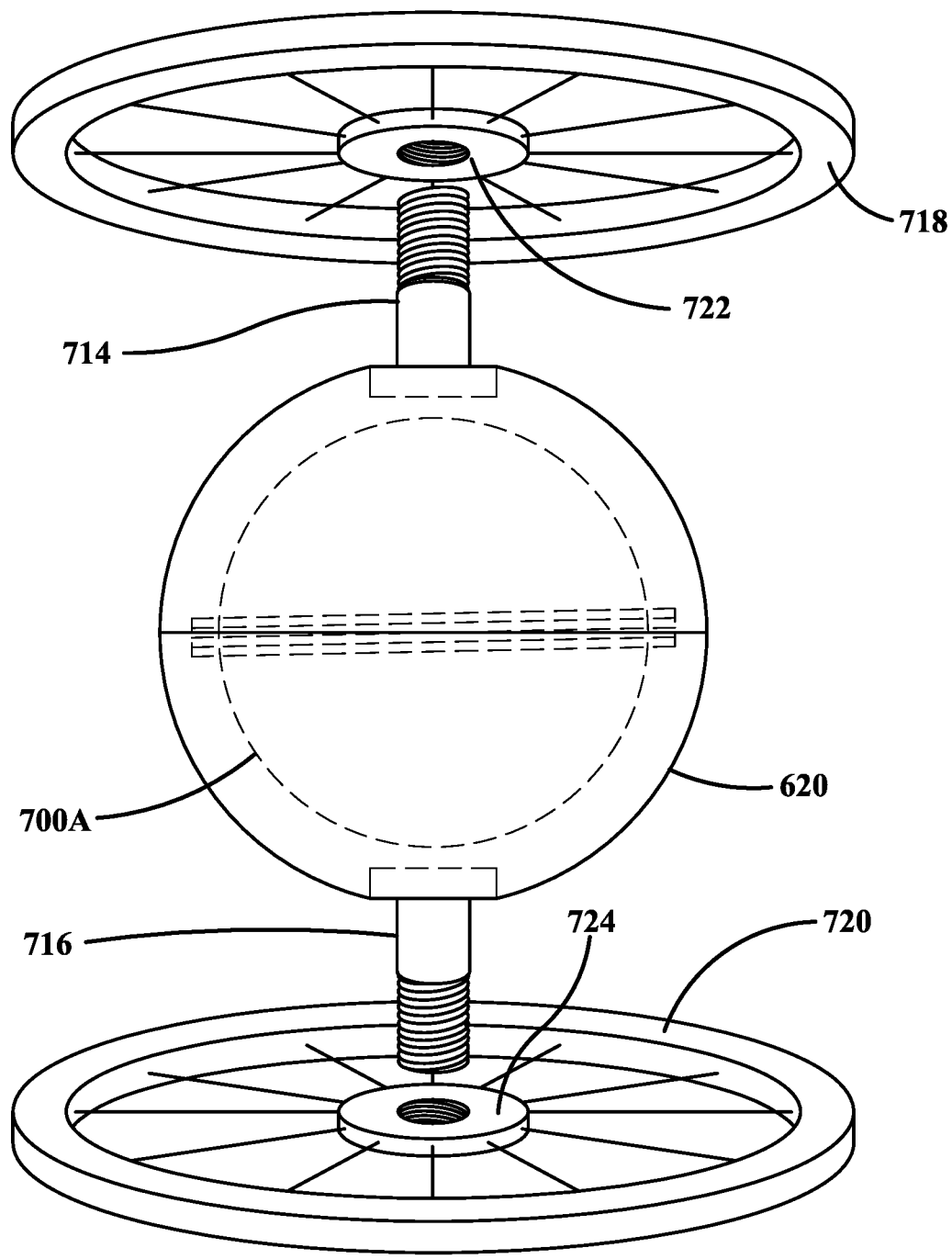
FIG. 44 is a perspective view of a thirteenth embodiment of the present invention.

FIG. 44 shows a thirteenth embodiment of the present invention. The toy 700 includes a ball 700A and the outer cover 620 illustrated in FIGS. 38-40 that covers or partially covers the ball 700A. The ball 700A is similar to the ball 10A except for the following. In this embodiment a threaded upper vertical axle 714 (as viewed in FIG. 44) is fixedly attached to the ball 700A at the top pole of the ball 700A. A threaded lower vertical axle 716 (as view in FIG. 42) is fixedly attached to the ball 700A at the top pole of the ball 700A. The upper and lower axles 714, 716 extend through their respective apertures 636, 644 of the outer cover 620. The toy may include a first and second wheels 718, 720 that may be removably attached to their corresponding upper and lower axles 714, 716. In particular, the first wheel 718 has a first threaded hub portion 722 that threadily receives and engages the upper axle 714, and the second wheel 720 includes a second threaded hub portion 724 that threadily receives and engages the lower axle 716. The first and second wheels 718, 720 enable the toy 700 to be rolled along a surface when the toy 700 is oriented such that the rotating axis 632 of the ball 700A is parallel to the surface. All other elements of this twelfth embodiment are similar in structure and function to that of the fourth embodiment shown in FIGS. 19 and 20 or alternatively FIG. 23.

Figure 45:
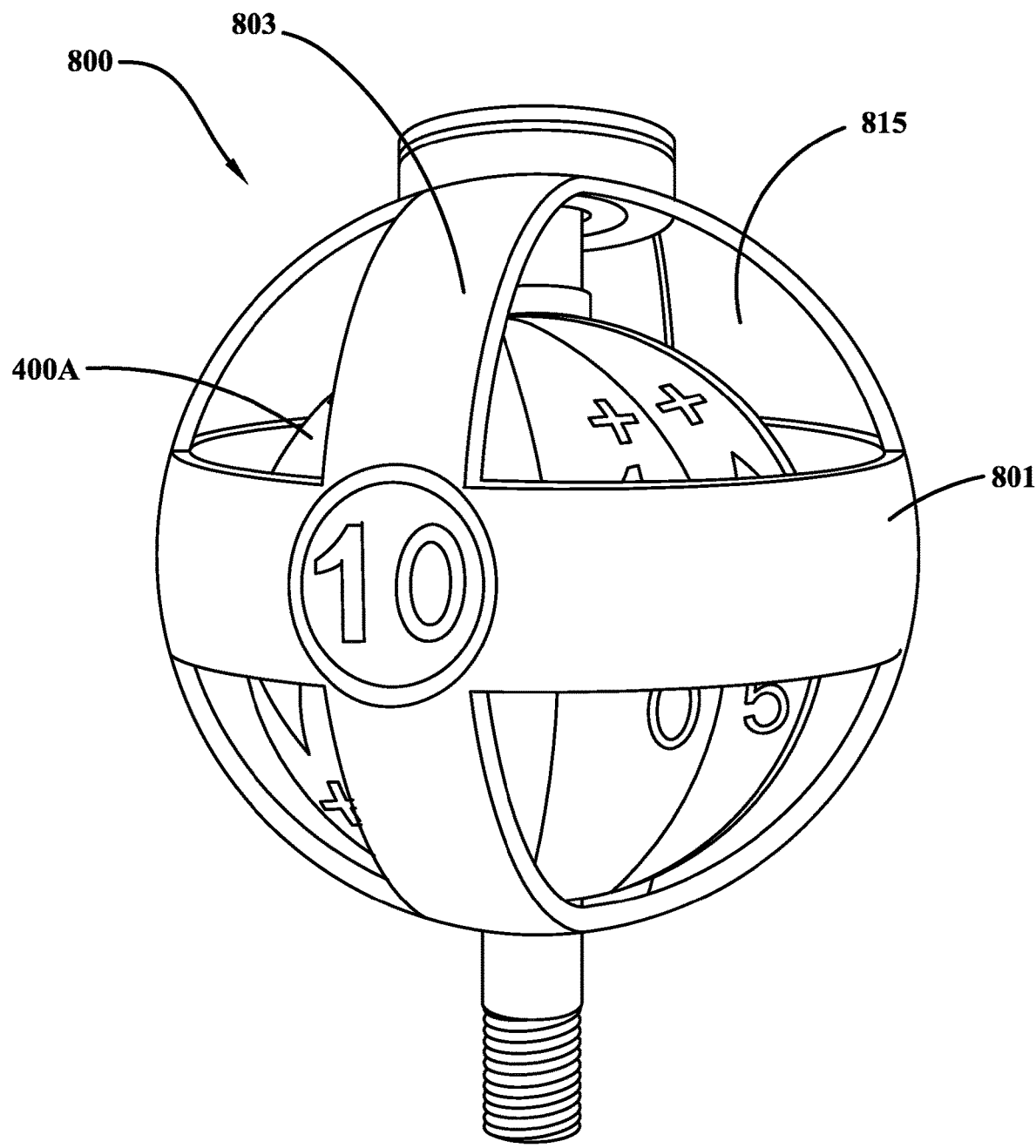
FIG. 45 shows a fourteenth embodiment of the toy of the present invention.

FIG. 45 shows a fourteenth embodiment of the toy 800 of the present invention showing an alternative version of the cover of the twelfth embodiment of the present invention. In this embodiment, the cover 820 is a framelike cover 820 that partially covers the ball 400A. The cover has a lateral ring member 801 located at the center of the ball that is intersected by four equally spaced longitudinal arch members 803. The arch members 803 and ring member 801 define window openings 815 that allow viewing of the portions of ball 400A such as portions which have numbers or other indicia on the ball 400A. All other elements of this fourteenth embodiment are similar in structure and function to the twelfth embodiment.

For the embodiments having the ball type toy, the size of the ball may be 2 inches in diameter and 2 inches in height to up to one foot in diameter and 1 foot in height. For the embodiment shown in FIG. 1-18, and the eighth, ninth, tenth, and eleventh embodiments, the base or board may be cone shaped instead of being planar. Also, the letters, numbers and characters in disc and ball version can be made to glow in the dark. As illustrated in FIG. 41, the outer covers 20, 420, 520, 620 of the ball type toys may optionally have apertures 602 for receiving a shaft or other connector 606 of a charm 604 or other object. The charm 604 may be removably attached to the outer cover via the shaft in suitable ways. In one example, the shaft 606 and aperture may be threaded so that the shaft is threadily attached to the wheel via the aperture. In another example, the shaft 606 may taper towards its free end to enable a friction attachment of the shaft to the wheel via the aperture. The charms may be in the shape of characters, letters, pictures or other objects.

Thus, there has been provided, in accordance with the present invention, a child's activity toy, which fully satisfies the goals, objects, and advantages set forth herein. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the claims.

Also, unless otherwise specifically noted, all of the features described herein may be combined with any of the above aspects, in any combination.

What is claimed is:

1. A toy comprising:
a ball having a surface at least partially visible;
an outer covering layer at least partially enclosing the surface of the ball and independently rotatable about the ball, and having at least a portion that is transparent or open to enable viewing of at least a portion of the surface of the ball;
a stand removably mounted to the ball; and
a first set of information on the outer covering layer and a second set of information on the surface of the ball related to the first set of information, wherein the first and second sets of information are educational in nature and associated with a game, wherein the first and second sets of information are configured to be visually aligned during play such that a user may rotate the outer covering layer to align elements of the first set with corresponding elements of the second set through the at least transparent portion of the outer covering layer, wherein the first and second sets of information may comprise numbers, words, or symbols or any combination thereof, wherein the first set of information and the second set of information are comprised of numbers and the numbers are in a pattern and relationship such that calculations can be made using the numbers, such that the toy can be used for practicing mental math or for a counting game.

2. The toy of claim 1, wherein the outer covering layer comprises an upper piece and a lower piece that are removably attached to each other.

3. The toy of claim 2, wherein the upper piece and the lower piece are threaded together.

4. The toy of claim 1 wherein the calculations are at least one of addition, subtraction, multiplication, division.

5. The toy of claim 1, wherein the toy further comprising a threaded shaft, wherein the threaded shaft is attached to a bottom of the ball and extends through the outer covering layer, wherein the stand includes a base and a sleeve, wherein the sleeve is attached to the base and extends upwardly from the base, wherein the sleeve threadilly engages the threaded shaft.

6. The toy of claim 1, wherein rotation of the outer covering layer causes random alignment of an element of the first set of information with an element of the second set of information.

7. The toy of claim 1, wherein the outer covering layer includes indicia, wherein the indicia are spaced apart from each other around an axis of rotation of the outer covering layer.

8. The toy of claim 7, wherein each indicium has a color that is different from each of the other indicia.

9. The toy of claim 7, wherein the indicia comprise arrows, wherein the arrows of the outer shell would stop and be aligned with different sections on the ball.

10. The toy of claim 9, wherein the second set of information includes numbers spaced apart from each other around the axis of rotation, wherein each number is associated with a respective arrow after rotating the cover relative to the ball about the axis of rotation, wherein the number associated with the respective arrow is located closest to the respective arrow.

11. The toy of claim 10, wherein the second set of information includes arithmetic operators, wherein each arithmetic operator is associated with a respective number, wherein the arithmetic operator associated with the respective number is located closest to the respective number.

12. The toy of claim 1, wherein the ball is in one piece or two pieces.

13. The toy of claim 1, wherein the ball is in two pieces that are removably connected together.

14. The toy of claim 13, wherein the two pieces are threadily engaged together.

15. A toy comprising:
a ball having a surface at least partially visible;
an outer covering layer at least partially enclosing the surface of the ball and independently rotatable about the ball, and having at least a portion which is transparent or opened to enable viewing of at least a portion of the surface of the ball;
a stand removably mounted to the ball;
a first set of information on the outer covering layer and a second set of information on the surface of the ball related to the first set of information, wherein the toy further comprising a threaded shaft, wherein the threaded shaft is attached to a bottom of the ball and extends through the outer covering layer, wherein the stand includes a base and a sleeve, wherein the sleeve is attached to the base and extends upwardly from the base,
wherein the sleeve threadilly engages the threaded shaft; and
a connector and a first bearing, wherein the connector is fixed to the ball and extends upwardly from the top of the ball, wherein the first bearing is disposed in the outer covering layer, wherein the first bearing rotatably receives the connector to enable the outer covering layer to rotate independently of the ball about an axis going from the top to the bottom of the ball.

16. The toy of claim 15, further comprising a second bearing disposed in the outer covering layer, wherein the second bearing rotatably receives the shaft to enable the outer covering layer to rotate independently of the ball about an axis extending from the top to the bottom of the ball.

17. The toy of claim 15, wherein the bearing comprises:
an inner bearing portion and an outer bearing portion;
ball bearings located between the inner bearing portion and the outer bearing portion,
wherein the connector is securely received in the first inner bearing such that the connector and the inner bearing rotate together relative to the outer covering.

18. The toy of claim 1,
wherein the ball has a smooth exterior surface free of being formed from annular rims.

19. The toy of claim 18, wherein the outer layer covering comprises an upper piece and a lower piece that are removably attached to each other.

* * * * *